United States Patent
Seki et al.

(10) Patent No.: US 11,896,949 B2
(45) Date of Patent: Feb. 13, 2024

(54) ADSORBENT, CANISTER AND METHOD FOR PRODUCING ADSORBENT

(71) Applicant: Mahle International GmbH, Stuttgart (DE)

(72) Inventors: Kenji Seki, Osaka (JP); Takayuki Hamase, Osaka (JP); Koji Yamasaki, Tokyo (JP)

(73) Assignee: Mahle International GmbH, Stuttgart (DE)

( * ) Notice: Subject to any disclaimer, the term of this patent is extended or adjusted under 35 U.S.C. 154(b) by 569 days.

(21) Appl. No.: 17/049,120

(22) PCT Filed: Apr. 24, 2019

(86) PCT No.: PCT/JP2019/017323
§ 371 (c)(1),
(2) Date: Apr. 22, 2021

(87) PCT Pub. No.: WO2019/208600
PCT Pub. Date: Oct. 31, 2019

(65) Prior Publication Data
US 2021/0237030 A1    Aug. 5, 2021

(30) Foreign Application Priority Data

Apr. 24, 2018 (JP) .................. 2018-083363

(51) Int. Cl.
*B01J 20/20* (2006.01)
*B01J 20/24* (2006.01)
(Continued)

(52) U.S. Cl.
CPC ............... *B01J 20/20* (2013.01); *B01J 20/24* (2013.01); *B01J 20/28011* (2013.01);
(Continued)

(58) Field of Classification Search
CPC ...... B01J 20/20; B01J 20/24; B01J 20/28011; B01J 20/28045; B01J 20/28071;
(Continued)

(56) References Cited

U.S. PATENT DOCUMENTS

2005/0247202 A1    11/2005  Seki
2009/0139407 A1*    6/2009  Aono ................ B01D 53/02
                                                       423/445 R
(Continued)

FOREIGN PATENT DOCUMENTS

CN            1662738 A        8/2005
CN          101365652 A        2/2009
(Continued)

OTHER PUBLICATIONS

Chinese Office Action dated Jan. 4, 2023 for copending Chinese App. No. 201980036365.0 (w_English_translation).
(Continued)

*Primary Examiner* — Sizo B Vilakazi
(74) *Attorney, Agent, or Firm* — Fishman Stewart PLLC

(57) ABSTRACT

An adsorbent to be packed into a canister, at least containing activated carbon and an additive material that has a higher heat capacity than the activated carbon. The adsorbent has first pores derived from the activated carbon that are less than 100 nm and second pores derived from meltable cores that are 1 μm or more. The adsorbent is in the form of a hollow molded body having an outer diameter of more than 6 mm and not more than 50 mm and including a cylindrical wall and honeycomb walls each having a thickness of not less than 0.2 mm and not more than 1 mm. The adsorbent has a volumetric specific heat of 0.08 kcal/L·° C. or more. The ratio of the volume of the second pores to the volume of the first pores is not less than 10% and not more than 200%.

31 Claims, 3 Drawing Sheets

(51) Int. Cl.
  *B01J 20/28* (2006.01)
  *B01J 20/30* (2006.01)
  *F02M 25/08* (2006.01)

(52) U.S. Cl.
  CPC ... *B01J 20/28045* (2013.01); *B01J 20/28071* (2013.01); *B01J 20/28073* (2013.01); *B01J 20/28083* (2013.01); *B01J 20/28085* (2013.01); *B01J 20/3007* (2013.01); *B01J 20/3014* (2013.01); *B01J 20/3042* (2013.01); *B01J 20/3078* (2013.01); *B01J 20/3092* (2013.01); *F02M 25/0854* (2013.01); *B01J 2220/46* (2013.01)

(58) Field of Classification Search
  CPC ............ B01J 20/28073; B01J 20/28083; B01J 20/28085; B01J 20/3007; B01J 20/3014; B01J 20/3042; B01J 20/3078; B01J 20/3092; B01J 2220/46; B01J 20/28; B01J 20/30; F02M 25/0854; F02M 25/08
  See application file for complete search history.

(56) References Cited

U.S. PATENT DOCUMENTS

2013/0269521 A1* 10/2013 Nishita ............... B01D 53/04
  95/91
2014/0124385 A1* 5/2014 Yamasaki .......... B01J 20/28092
  502/418
2015/0184621 A1* 7/2015 Arase ................ B01D 53/0407
  96/131
2018/0178194 A1 6/2018 Hasumi
2021/0237030 A1* 8/2021 Seki ................ B01J 20/28083

FOREIGN PATENT DOCUMENTS

| | | |
|---|---|---|
| CN | 103620203 A | 3/2014 |
| CN | 104747325 A | 7/2015 |
| JP | H10339218 A | 12/1998 |
| JP | 3337398 B2 | 8/2002 |
| JP | 2007107518 A | 4/2007 |
| JP | 201311243 A | 1/2013 |
| JP | 2013177889 A | 9/2013 |
| JP | 2015124644 A | 7/2015 |
| JP | 2015124645 A | 7/2015 |
| JP | 5867800 B2 | 1/2016 |
| JP | 6203043 B2 | 9/2017 |
| JP | 2018103100 A | 7/2018 |
| WO | 2007077985 A1 | 7/2007 |

OTHER PUBLICATIONS

Chinese Search Report dated Dec. 28, 2022 for copending Chinese App. No. 201980036365.0 (w_English_translation).

Japanese Office Action dated Mar. 28, 2023 for copending Japanese App. No. 2020-515502 (w_English_translation).

* cited by examiner

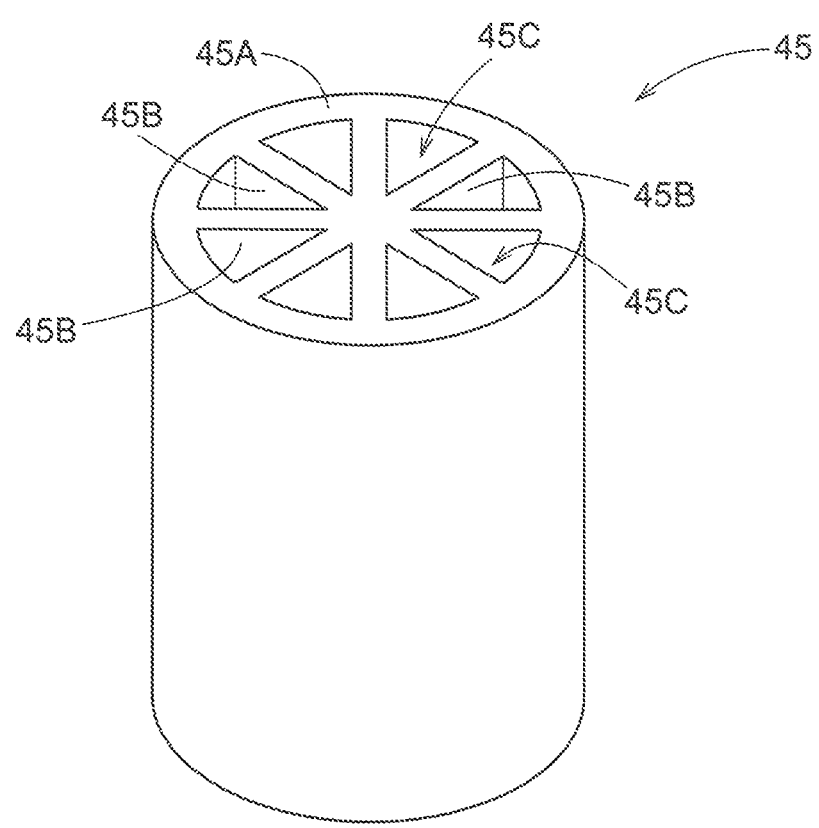

ADSORBENT, CANISTER AND METHOD FOR PRODUCING ADSORBENT

CROSS-REFERENCE TO RELATED APPLICATIONS

This application is the United States national phase of International Application No. PCT/JP2019/017323 filed Apr. 24, 2019, and claims priority to Japanese Patent Application No. 2018-083363 filed Apr. 24, 2018, the disclosures of which are hereby incorporated by reference in their entirety.

BACKGROUND OF THE INVENTION

1. Field of the Invention

The present invention relates to an adsorbent for use in a fuel vapor treatment canister for preventing fuel vapor released from a fuel tank from diffusing into the atmosphere, a canister, and a method for producing an adsorbent.

2. Description of Related Art

Fuel vapor treatment canisters are used conventionally. In order to prevent fuel vapor from diffusing into the atmosphere, such canisters capture fuel vapor generated through the evaporation of gasoline fuel stored in a fuel tank while, for example, a vehicle is not moving, through adsorption of the fuel vapor onto an adsorbent such as activated carbon.

An adsorbent such as activated carbon has properties of exhibiting an increased adsorption capacity as the temperature thereof decreases and a decreased adsorption capacity as the temperature thereof increases. Accordingly, it is desirable that the temperature of the adsorbent is low when adsorbing fuel vapor and high when purging. Fuel vapor, on the other hand, gives off heat (heat of condensation) when it is adsorbed on an adsorbent, whereas it takes heat (heat of vaporization) from the adsorbent when it is desorbed (purged) from the adsorbent. In other words, the adsorption of the fuel vapor onto the adsorbent is an exothermic reaction and desorption of fuel vapor from an adsorbent is an endothermic reaction. Thus, heat generation and heat absorption caused by the adsorption and desorption of the fuel vapor bring about temperature states of the adsorbent that are opposite to desired temperature states, i.e., they act to impair the adsorption and desorption performance of the adsorbent. Accordingly, in order to improve the performance of the canister, it is desirable to suppress the change in temperature of the adsorbent due to the heat generation and heat absorption during the adsorption and desorption of the fuel vapor.

Japanese Patent No. JP 3337398B (Patent Document 1) discloses dispersing, in a container packed with activated carbon as an adsorbent, a heat storage material that has a higher heat capacity and a higher thermal conductivity than the activated carbon, thereby obtaining an adsorbent having a temperature suppressing effect. Patent Document 1 discloses metal particles and metal oxide particles as the heat storage material. The adsorbent in which such a heat storage material is dispersed can suppress an increase in the temperature of the activated carbon because heat generated by the activated carbon during adsorption of fuel vapor is transferred to the heat storage material. On the other hand, during desorption of the adsorbed fuel, the activated carbon takes the heat retained in the heat storage material, whereby a decrease in the temperature of the activated carbon is also suppressed.

In Patent Document 1 when, for example, aluminum particles are used as the metal particles, the adhesion rate of the aluminum particles to the activated carbon is set to 10 to 15 vol % in order to maximize the adsorption performance. Further, in Patent Document 1, when, for example, alumina particles are used as the metal oxide particles, the adhesion rate of the alumina particles to the activated carbon is set to 15 to 20 vol % in order to maximize the adsorption performance.

Japanese Patent No. JP 5867800B (Patent Document 2) discloses an adsorbent that is in a columnar shape with an outer diameter of 4 to 6 mm and in which respective parts of a radial wall have a thickness of 0.6 to 3 mm. In this adsorbent, the ratio of the volume of macroscopic pores (having a diameter of not less than 100 nm and less than 100000 nm) to the volume of microscopic pores (having a diameter of not less than 2 nm and less than 100 nm) is 65% to 150%. Since a canister disclosed in Patent Document 2 uses a hollow adsorbent, it exhibits lower pressure loss than a canister that uses solid pellets, and thus exhibits favorable purge performance. Moreover, since the ratio of the macroscopic pores is adjusted, the hardness of the adsorbent can be increased while ensuring the adsorption performance of the adsorbent.

Japanese Patent No. JP 6203043B (Patent Document 3) discloses a hollow adsorbent that is in a columnar shape with an outer diameter of 4 to 6 mm similarly to the adsorbent disclosed in Patent Document 2 and in which respective parts have a thickness of 0.6 mm to 1.5 mm. In the adsorbent disclosed in Patent Document 3, the difference in equilibrium adsorption capacity of n-butane between a butane concentration of 5 vol % and a butane concentration of 50 vol % is adjusted to more than 35 g/L. With this configuration, the adsorption performance for butane in fuel vapor can be enhanced.

The adsorbent of Patent Document 1 exhibits a certain degree of temperature suppressing effect owing to the presence of the heat storage material in the canister such as metal oxide particles together with the activated carbon. However, the content of the metal oxide particles or the like is not enough to sufficiently ensure the adsorption performance of the adsorbent. Besides, since the metal oxide particles or the like are contained in the container together with the activated carbon as the adsorbent, the amount of the activated carbon is reduced by an amount corresponding to the amount of the metal oxide particles or the like contained in the container. As a result, in the adsorbent disclosed in Patent Document 1, the adsorption performance for fuel vapor is deteriorated.

In addition, the adsorbent of Patent Document 2 has an outer diameter of 4 to 6 mm, which is relatively small, and thus the proportion of the framework of the activated carbon is high in order to ensure the strength of the adsorbent. As a result, the purge performance is deteriorated, resulting in insufficient diurnal breathing loss (DBL) performance.

Further, the adsorbent of Patent Document 3 can improve the performance of the adsorption by adjusting the difference in equilibrium adsorption amount of n-butane, however, the purge performance thereof is low and a large amount of butane remains after purging. Accordingly, the DBL performance is not sufficient.

SUMMARY OF THE INVENTION

The present invention was conceived in light of the above-described problems, and it is an object of the present invention to provide an adsorbent, a canister, and a method for producing an adsorbent, capable of improving adsorption performance and purge performance.

(Configuration)

The present invention provides an adsorbent with the following characteristic configuration, namely, an adsorbent to be packed into a canister, including: activated carbon; and an additive material having a higher heat capacity than the activated carbon, wherein the adsorbent has first pores that are derived from the activated carbon and are less than 100 nm and second pores that are derived from meltable cores and are 1 μm or more, wherein the adsorbent is in a form of a hollow molded body that has an outer diameter of more than 6 mm and not more than 50 mm and in which respective parts have a thickness of not less than 0.2 mm and not more than 1 mm, wherein the adsorbent has a volumetric specific heat of 0.08 kcal/L·° C. or more, and wherein the ratio of the volume of the second pores to the volume of the first pores is not less than 10% and not more than 200%.

According to the above characteristic configuration, the adsorbent has the first pores of less than 100 nm and the second pores of 1 μm or more. Accordingly, for example, butane in fuel vapor can be captured on the molecular level by the first pores of less than 100 nm, whereby the adsorption performance can be enhanced. Moreover, the second pores of 1 μm or more serve as passages through which fuel vapor flows, and this allows the purge performance to be enhanced.

Also, since the ratio of the volume of the second pores to the volume of the first pores is not less than 10% and not more than 200%, the adsorption performance and the purge performance can be improved. As a result, the diurnal breathing loss (DBL) performance is improved. When the ratio is less than 10%, the rate of adsorption and desorption of fuel vapor is slow, and accordingly, the improvement in the purge performance is suppressed. On the other hand, when the ratio is more than 200%, the ratio of the first pores of less than 100 nm, which contribute to the adsorption of fuel vapor, is low, and this incurs the deterioration of the adsorption performance.

The adsorbent contains, in addition to the activated carbon, the additive material that has a higher heat capacity than the activated carbon, and the adsorbent has the above-described volumetric specific heat and the like. Accordingly, heat generated by the activated carbon during adsorption of fuel vapor is transferred to the additive material. As a result, an increase in the temperature of the activated carbon is suppressed, whereby the adsorption performance of the adsorbent is improved. On the other hand, during purging of the adsorbed fuel, the activated carbon takes the heat retained in the additive material. As a result, a decrease in the temperature of the activated carbon is suppressed, whereby the purge performance of the adsorbent is improved.

Further, the adsorbent is in a hollow shape that has an outer diameter of more than 6 mm and in which respective parts have a thickness in the predetermined range. Accordingly, the first pores and the second pores can have large volumes in this framework. As a result, the adsorption performance and the purge performance are improved, whereby the DBL performance is improved. On the other hand, although the outer diameter of the adsorbent is not more than 50 mm, the adsorbent has the constituent features such as the presence of the first pores of less than 100 nm and the second pores of 1 μm or more, the ratio of the volume of the second pores to the volume of the first pores, and the addition of the additive material to the adsorbent, as described above. With this configuration, while reducing the size of the adsorbent, the adsorption performance and the purge performance can be improved, whereby the DBL performance can be improved. In addition, the hardness of the adsorbent is also improved.

(Configuration)

The configuration of the adsorbent according to the present invention is further characterized in that the adsorbent has a thermal conductivity of 0.1 kcal/m·h·° C. or more.

According to the above characteristic configuration, the adsorbent has the above-described thermal conductivity. With this configuration, the function of the adsorbent to transfer heat generated by the activated carbon to the additive material during adsorption of fuel vapor can be further improved. As a result, an increase in the temperature of the activated carbon is suppressed, whereby the adsorption performance of the adsorbent is improved. On the other hand, the function of the activated carbon to take the heat retained in the additive material during purging of the adsorbed fuel is further improved. As a result, a decrease in the temperature of the activated carbon is suppressed, whereby the purge performance of the adsorbent is improved.

(Configuration)

The configuration of the adsorbent according to the present invention is further characterized in that the additive material is a metal oxide.

In general, metal oxides have a higher volumetric specific heat and a higher thermal conductivity than activated carbon. According to the above characteristic configuration, by adding such a metal oxide as the additive material to the adsorbent, an increase and a decrease in the temperature of the additive material are suppressed, whereby the adsorption performance and the purge performance can be improved.

(Configuration)

The configuration of the adsorbent according to the present invention is further characterized in that the mass of the additive material is not less than 1.0 times and not more than 3.0 times the mass of the activated carbon.

According to the above characteristic configuration, the mass of the additive material that have a higher volumetric specific heat and a higher thermal conductivity than the activated carbon, for example, the metal oxide, is not less than 1.0 times and not more than 3.0 times the mass of the activated carbon. With this configuration, an increase and a decrease in the temperature of the adsorbent are suppressed, whereby the adsorption performance and the purge performance can be improved.

When the ratio of the additive material is increased, the proportion of the activated carbon in the adsorbent becomes low, whereby the ratio of the first pores of less than 100 nm is reduced. As a result, the adsorption performance may be deteriorated. The deterioration of the adsorption performance can be suppressed by adjusting the ratio of the volume of the second pores to the volume of the first pores to not less than 10% and not more than 200% and by forming the adsorbent in a hollow shape having an outer diameter of more than 6 mm and not more than 50 mm as described above.

(Configuration)

The configuration of the adsorbent according to the present invention is further characterized in that the additive material is at least one of a phase change material that has a phase change temperature of 35° C. or lower and a phase transition material that has a phase transition temperature of 35° C. or lower.

According to the above characteristic configuration, the adsorbent contains, in addition to the activated carbon, the additive material that has a higher heat capacity than the activated carbon (at least one of the phase change material having a phase change temperature of 35° C. or lower and the phase transition material having a phase transition temperature of 35° C. or lower). Accordingly, heat generated by the activated carbon during adsorption of fuel vapor is transferred to the additive material. As a result, an increase in the temperature of the activated carbon is suppressed, whereby the adsorption performance of the adsorbent is improved. On the other hand, during purging of the adsorbed fuel, the activated carbon takes the heat retained in the additive material. As a result, a decrease in the temperature of the activated carbon is suppressed, whereby the purge performance of the adsorbent is improved.

As the additive material, at least one of the phase change material having a phase change temperature of 35° C. or lower and the phase transition material having a phase transition temperature of 35° C. or lower can be used. Since heat is taken from the activated carbon during desorption of fuel vapor from the activated carbon, the temperature of the activated carbon drops, whereby the purge performance of the activated carbon is deteriorated. The deterioration of the purge performance becomes serious when the temperature of the activated carbon is lower than 10° C. According to the above characteristic configuration, since the adsorbent contains, as the additive material, at least one of the phase change material having a phase change temperature of 35° C. or lower and the phase transition material having a phase transition temperature of 35° C. or lower, an excessive decrease in the temperature of the activated carbon contained in the adsorbent is suppressed, and this allows purging to be performed appropriately.

(Configuration)

The configuration of the adsorbent according to the present invention is further characterized in that the mass of the additive material is not less than 0.05 times and not more than 0.3 times the mass of the activated carbon.

By setting the ratio of the phase change material, the phase transition material, and the like to be added to not less than 0.05 times and not more than 0.3 times the mass of the activated carbon, the temperature of the activated carbon can be adjusted to an appropriate temperature. When the ratio is less than 0.05 times, for example, the effect of suppressing an excessive decrease in the temperature of the activated carbon by the phase change material, the phase transition material, and the like cannot be obtained sufficiently. On the other hand, when the ratio is more than 0.3 times, the proportion of the activated carbon in the adsorbent is reduced by the phase change material, the phase transition material, and the like added to the adsorbent, whereby the adsorption performance is deteriorated.

(Configuration)

The configuration of the adsorbent according to the present invention is further characterized in that the pore volume of the first pores in the adsorbent is less than 0.55 ml/g, and the ratio of the volume of the second pores to the volume of the first pores is not less than 20% and not more than 90%.

According to the above characteristic configuration, since the pore volume of the first pores of less than 100 nm is less than 0.55 ml/g, the adsorption performance for molecules of butane and the like in fuel vapor by the first pores is prevented from being excessively high, whereby the purge performance is improved. On the other hand, when the pore volume of the first pores is 0.55 ml/g or more, the butane working capacity (BWC) as determined according to a BWC evaluation method specified in ASTM D5228 increases, resulting in deteriorated purge performance. As a result, the DBL performance is deteriorated.

Moreover, since the purge performance is improved by setting the pore volume of the first pores to less than 0.55 ml/g as described above, the ratio of the volume of the second pores to the volume of the first pores can be set relatively small, namely, to not less than 20% and not more than 90%.

(Configuration)

The configuration of the adsorbent according to the present invention is further characterized in that the second pores in a framework of the molded body constituting the adsorbent are present in a proportion of not less than 5 vol % and not more than 40 vol % of the framework.

According to the above characteristic configuration, by adjusting the proportion of the second pores in the framework of the molded body to the above-described range, the purge performance can be improved while increasing the rate of adsorption and desorption. When the proportion of the second pores in the framework is less than 5 vol %, the proportion of the second pores of 1 μm or more in the framework of the adsorbent is too low, and the flow of fuel vapor is thus hindered. Accordingly, a sufficiently fast rate of adsorption and desorption and sufficient purge performance cannot be attained. On the other hand, when the proportion of the second pores in the framework is more than 40 vol %, the proportion of the second pores of 1 μm or more in the framework of the adsorbent is high, and this results in reduced strength and deteriorated adsorption performance.

(Configuration)

The configuration of the adsorbent according to the present invention is further characterized in that the meltable cores are fibrous substances and have a diameter of not less than 1.0 μm and not more than 100 μm and a length of less than 1 mm.

According to the above characteristic configuration, by the meltable cores having a diameter and a length in the predetermined ranges, the second pores derived from the meltable cores are formed in the adsorbent. Since these second pores are relatively large and also have a length in the predetermined range, fuel vapor flows smoothly through the second pores, whereby the adsorption performance and the purge performance can be improved.

When the meltable cores have a diameter of less than 1.0 μm, fuel vapor does not flow smoothly. This lowers the rate of desorption, resulting in deteriorated purge performance. On the other hand, when the meltable cores satisfy at least one of a diameter of more than 100 μm and a length of 1 mm or more, the volume of the second pores present in the framework of the adsorbent is large, whereby the hardness of the adsorbent is reduced.

(Configuration)

The configuration of the adsorbent according to the present invention is further characterized in that the meltable cores are pulp fibers that have a length of 0.5 mm or less.

(Configuration)

The configuration of the adsorbent according to the present invention is further characterized in that the adsorbent contains an inorganic binder, and the meltable cores are present in an amount of not less than 10 mass % and not more than 45 mass % with respect to the total mass of the activated carbon and the inorganic binder.

According to the above characteristic configuration, by adjusting the amount of the meltable cores with respect to the total mass of the activated carbon and the inorganic binder to the above-described range, the purge performance can be improved while increasing the rate of adsorption and desorption. When the ratio of the meltable cores is less than 10 mass % with respect to the total mass, the proportion of the second pores of 1 μm or more in the adsorbent is too low, and the flow of fuel vapor is thus hindered. Accordingly, a sufficiently fast rate of adsorption and desorption and sufficient purge performance cannot be attained. On the other hand, when the ratio of the meltable cores is more than 45 mass % with respect to the total mass, the proportion of the second pores of 1 μm or more in the adsorbent is high, and this results in reduced strength and deteriorated adsorption performance. In addition, the hardness of the adsorbent is reduced.

(Configuration)

The configuration of the adsorbent according to the present invention is further characterized in that the meltable cores have C—N bonds.

According to the above characteristic configuration, when the meltable cores having C—N bonds, the activated carbon, the additive material, and the like are kneaded and heated to form the adsorbent, the C—N bonds in the meltable cores are cleaved through the heating, thereby allowing the meltable cores to sublime easily. As a result, the second pores derived from the fibrous meltable cores having C—N bonds can be formed in the adsorbent.

(Configuration)

The configuration of the adsorbent according to the present invention is further characterized in that a difference in equilibrium adsorption capacity versus n-butane concentration is more than 35 g/L between an n-butane concentration of 5 vol % and an n-butane concentration of 50 vol %.

According to the above characteristic configuration, the adsorbent exhibits a large effective adsorption capacity for molecules of butane and the like in fuel vapor and thus can exhibit enhanced adsorption performance. Moreover, since the adsorbent has high adsorption performance, the adsorbent can be made smaller and lighter. Regarding the deterioration of the purge performance due to the high adsorption performance, since the metal oxide, the phase change material, and the like are present in sufficient amounts in the adsorbent, the temperature change caused by heat during adsorption and desorption can be sufficiently suppressed.

(Configuration)

The configuration of the adsorbent according to the present invention is further characterized in that the BWC of the adsorbent as determined according to a BWC evaluation method specified in ASTM D5228 is not less than 6.0 g/dL and less than 9.7 g/dL.

According to the above characteristic configuration, since the adsorbent exhibits a large BWC, i.e., a large effective adsorption capacity for butane, the adsorption performance of the adsorbent can be enhanced. Accordingly, the adsorbent can be made smaller and lighter.

(Configuration)

The configuration of the adsorbent according to the present invention is further characterized in that an amount of residual butane as determined after causing the adsorbent to adsorb and then desorb butane according to a BWC evaluation method specified in ASTM D5228 is less than 1.7 g/dL.

The adsorbent with the above characteristic configuration exhibits an amount of residual butane of less than 1.7 g/dL and thus is excellent in purge performance.

(Configuration)

The configuration of the adsorbent according to the present invention is further characterized in that the adsorbent is the molded body that is in at least one form selected from a honeycomb, a hollow pellet, and a honeycomb pellet.

The adsorbent with the above characteristic configuration is in at least one form selected from a honeycomb, a hollow pellet, and a honeycomb pellet, and has a hollow structure. Accordingly, fuel vapor can flow smoothly through hollow regions, whereby the contact time, the contact area, and the like of the first pores of the activated carbon with fuel vapor and with air used during purging are increased. As a result, the adsorption performance can be improved.

(Configuration)

The configuration of the adsorbent according to the present invention is further characterized in that the second pores of 1 μm or more have an average diameter of not less than 1 μm and not more than 100 μm.

According to the above characteristic configuration, since the average diameter of the second pores is not less than 1 μm and not more than 100 μm, reduction in the hardness of the adsorbent can be suppressed. When the average diameter of the second pores is more than 100 μm, the second pores in the adsorbent is too large to allow the adsorbent to maintain its hardness, and such an adsorbent is not applicable to practical use.

(Configuration)

The configuration of the adsorbent according to the present invention is further characterized in that at least a portion of the parts has a thickness of not less than 0.2 mm and less than 0.6 mm.

According to the above characteristic configuration, at least a portion of the parts of the hollow adsorbent has a thickness of not less than 0.2 mm and less than 0.6 mm. By setting the thickness as described above, spaces formed by the parts constituting the hollow structure can be relatively large, and accordingly, fuel vapor can flow smoothly through these spaces. Owing to the smooth flow of fuel vapor through the spaces, the contact between the fuel vapor fuel and the first and second pores can be promoted. Accordingly, for example, butane in fuel vapor can be captured on the molecular level by the first pores of less than 100 nm, whereby the adsorption performance can be enhanced. Also, owing to the reduced thickness and the presence of the second pores of 1 μm or more, the purge performance using air can be enhanced. Thus, the adsorption performance and the purge performance can be improved, whereby the DBL performance is improved.

(Configuration)

The configuration of the adsorbent according to the present invention is further characterized in that the mass of the additive material is not less than 0.42 times and not more than 3.0 times the mass of the activated carbon.

The additive material suppresses heat generation of the activated carbon during adsorption of fuel vapor to improve the adsorption performance of the adsorbent, and also suppresses a decrease in the temperature of the activated carbon during purging of the adsorbed fuel to improve the purge performance. According to the above characteristic configuration, when at least a portion of the parts of the hollow adsorbent has a thickness of not less than 0.2 mm and less than 0.6 mm, even if the lower limit of the ratio of the added additive material to the activated carbon is set to a small value, the adsorption performance and the purge performance can still be improved, whereby the DBL performance can be improved.

(Configuration)

The configuration of the adsorbent according to the present invention is further characterized in that the mass of the additive material is not less than 0.42 times and less than 1.5 times the mass of the activated carbon.

(Configuration)

The configuration of the adsorbent according to the present invention is further characterized in that the mass of the additive material is not less than 0.42 times and not more than 1.0 times the mass of the activated carbon.

(Configuration)

The configuration of the adsorbent according to the present invention is further characterized in that the additive material is a metal oxide.

In general, metal oxides have a higher volumetric specific heat and a higher thermal conductivity than activated carbon. According to the above characteristic configuration, by adding such a metal oxide as the additive material to the adsorbent, an increase and a decrease in the temperature of the adsorbent are suppressed, whereby the adsorption performance and the purge performance can be improved.

(Configuration)

The configuration of the adsorbent according to the present invention is further characterized in that the pore volume of the first pores in the adsorbent is less than 0.8 ml/g, and the ratio of the volume of the second pores to the volume of the first pores is not less than 10% and not more than 90%.

When at least a portion of the parts of the hollow adsorbent has a thickness of not less than 0.2 mm and less than 0.6 mm, the upper limit of the pore volume of the first pores of less than 100 nm can be set to less than 0.8 ml/g as in the above characteristic configuration. Since fuel vapor flows through the spaces formed by the respective parts of the adsorbent in a manner as described above, the adsorption performance for, for example, butane in the fuel vapor and the purge performance by the first and second pores formed in the adsorbent can be improved. By setting the thickness of at least a portion of the adsorbent to fall within the range of not less than 0.2 mm and less than 0.6 mm, even if the upper limit of the pore volume of the first pores is set to a large value of less than 0.8 ml/g and the adsorption performance for molecules of butane and the like in fuel vapor by the first pores is thus made high, the purge performance and the DBL performance can still be improved owing to the small thickness. The reason for this is considered to be that, since the thickness of at least a portion of the adsorbent is in the range of not less than 0.2 mm and less than 0.6 mm, the purge performance using air can be improved owing to this small thickness.

It should be noted that, if the pore volume of the first pores is 0.8 ml/g or more when the thickness of at least a portion of the adsorbent is not less than 0.2 mm and less than 0.6 mm, the butane working capacity (BWC) as determined according to a BWC evaluation method specified in ASTM D5228 is too large, whereby the purge performance is deteriorated. As a result, the DBL performance is deteriorated.

Further, since the purge performance is improved when the pore volume of the first pores is less than 0.8 ml/g as described above, the ratio of the volume of the second pores to the volume of the first pores can be set relatively small with the lower limit thereof being 10% or more.

(Configuration)

The configuration of the adsorbent according to the present invention is further characterized in that the adsorbent contains an inorganic binder, and the meltable cores are present in an amount of not less than 5 mass % and not more than 45 mass % with respect to the total mass of the activated carbon and the inorganic binder.

According to the above characteristic configuration, by adjusting the amount of the meltable cores with respect to the total mass of the activated carbon and the inorganic binder to the above-described range, the purge performance can be improved while increasing the rate of adsorption and desorption. By setting the thickness of at least a portion of the adsorbent to fall within the range of not less than 0.2 mm and less than 0.6 mm, even if the lower limit of the ratio of the meltable cores with respect to the total mass of the activated carbon and the inorganic binder is set to a small value of 5 mass % or more, the purge performance and the DBL performance can still be improved because the thickness of the adsorbent is small.

When the ratio of the meltable cores is less than 5 mass % with respect to the total mass, the proportion of the second pores of 1 µm or more in the adsorbent is too low, and the flow of fuel vapor and air is thus hindered. Accordingly, a sufficiently fast rate of adsorption and desorption and sufficient purge performance cannot be attained. On the other hand, when the ratio of the meltable cores is more than 45 mass % with respect to the total mass, the proportion of the second pores of 1 µm or more in the adsorbent is high, and this results in reduced strength and deteriorated adsorption performance. In addition, the hardness of the adsorbent is reduced.

(Configuration)

The configuration of the adsorbent according to the present invention is further characterized in that the BWC of the adsorbent as determined according to a BWC evaluation method specified in ASTM D5228 is not less than 6.0 g/dL and less than 11.0 g/dL.

According to the above characteristic configuration, since the adsorbent exhibits a large BWC, i.e., a large effective adsorption capacity for butane, the adsorption performance of the adsorbent can be enhanced. Accordingly, the adsorbent can be made smaller and lighter. Also, by setting the thickness of at least a portion of the adsorbent to fall within the range of not less than 0.2 mm and less than 0.6 mm, the upper limit of the BWC can be set to a relatively large value of less than 11.0 g/dL.

(Configuration)

The present invention provides a canister with the following characteristic configuration, namely, a canister for treating fuel vapor, including: a tank port configured to be in communication with an upper gas chamber of a fuel tank of an internal combustion engine; a purge port configured to be in communication with an air intake path of the internal combustion engine; an atmospheric port that is open to the atmosphere; and an adsorbent chamber through which fuel vapor flows from the tank port to the atmospheric port, wherein the above-described adsorbent is disposed in an atmosphere-side adjacent region that is provided adjacent to the atmospheric port in the adsorbent chamber.

The desorption (purge) of the fuel vapor from the activated carbon contained in the adsorbent is performed by drawing air through the purge port to cause air to flow into the canister through the atmospheric port. Since heat is taken from the activated carbon during desorption of fuel vapor from the activated carbon, the temperature of the activated carbon drops, whereby the purge performance of the activated carbon is deteriorated. The deterioration of the purge performance becomes serious when the temperature of the activated carbon is lower than 10° C. According to the above characteristic configuration, since the above-described adsorbent is disposed in the atmosphere-side adjacent region that is provided adjacent to the atmospheric port in the adsorbent chamber, an excessive decrease in the temperature of the activated carbon contained in the adsorbent disposed in the atmosphere-side adjacent region is suppressed, and this allows purging to be performed appropriately.

(Configuration)

The canister according to the present invention is further characterized in that an adsorbent that contains activated carbon whose BWC as determined according to a BWC evaluation method specified in ASTM D5228 is 15.0 g/dL or more and an additive material that is at least one of a phase change material having a phase change temperature of 36° C. or higher and a phase transition material having a phase transition temperature of 36° C. or higher is disposed in a tank-side adjacent region that is provided adjacent to the tank port in the adsorbent chamber.

According to the above characteristic configuration, an adsorbent that contains an additive material such as a phase change material and the like that absorbs and releases latent heat in response to a change in temperature is disposed in the tank-side adjacent region in the adsorbent chamber. Accordingly, the adsorbent suppresses the change in temperature of the activated carbon, whereby deterioration of the performance of the activated carbon can be prevented.

When feeding fuel to the fuel tank, a large amount of fuel vapor may flow into the canister at one time. The fuel vapor that has flowed into the canister from the tank port forms an adsorption zone from the vicinity of the tank port toward the atmosphere port, and the temperature of the activated carbon rises in the adsorption zone owing to the heat of adsorption. The deterioration of the adsorption performance becomes serious when the temperature of the activated carbon is higher than 35° C. (about 35° C.). According to the above characteristic configuration, the tank-side adjacent region is a region where the temperature of the activated carbon can be 35° C. or higher owing to heat generated through adsorption of fuel vapor onto the activated carbon at the time of feeding fuel to the fuel tank, and the adsorbent containing the additive material that is at least one of the phase change material having a phase change temperature of 36° C. or higher and the phase transition material having a phase transition temperature of 36° C. or higher is disposed in the tank-side adjacent region. This configuration is preferable because it suppresses an increase in the temperature of the activated carbon to higher than 35° C.

Moreover, since the adsorbent containing the activated carbon is disposed in the tank-side adjacent region, a decrease in an amount of activated carbon to be contained in the adsorbent chamber is suppressed, whereby the deterioration of the adsorption performance can be suppressed.

(Configuration)

The characteristic configuration of a method for producing the above-described adsorbent according to the present invention including: mixing at least the activated carbon, the additive material that has a higher heat capacity than the activated carbon, and the meltable cores, and then kneading the resultant mixture; molding the kneaded mixture to obtain the molded body; and subjecting the molded body to at least one of drying and firing.

According to the above characteristic configuration, the adsorbent whose adsorption performance and purge performance are improved as described above can be obtained.

(Configuration)

The configuration of the method for producing adsorbent according to the present invention is further characterized in that the additive material is a metal oxide.

According to the above characteristic configuration, by adding a metal oxide, which generally has a higher volumetric specific heat and a higher thermal conductivity than activated carbon, to the adsorbent as the additive material, an increase and a decrease in the temperature of the adsorbent are suppressed, whereby the adsorption performance and the purge performance can be improved.

(Configuration)

The configuration of the method for producing adsorbent according to the present invention is further characterized in that the respective parts have a thickness of not less than 0.2 mm and not more than 1 mm, and the mass of the additive material is not less than 1.0 times and not more than 3.0 times the mass of the activated carbon.

According to the above characteristic configuration, an increase and a decrease in the temperature of the adsorbent are suppressed, whereby the adsorption performance and the purge performance can be improved.

(Configuration)

The configuration of the method for producing adsorbent according to the present invention is further characterized in that at least a portion of the parts has a thickness of not less than 0.2 mm and less than 0.6 mm, and the mass of the additive material is not less than 0.42 times and not more than 3.0 times the mass of the activated carbon.

According to the above characteristic configuration, by setting the thickness of at least a portion of the parts of the hollow adsorbent to not less than 0.2 mm and less than 0.6 mm, spaces formed by the parts constituting the hollow structure can be relatively large, and accordingly, fuel vapor can flow smoothly through these spaces. Owing to the smooth flow of fuel vapor through the spaces, the contact between the fuel vapor and the first and second pores can be promoted. Accordingly, for example, butane and the like in fuel vapor can be captured on the molecular level by the first pores of less than 100 nm, whereby the adsorption performance can be enhanced. Also, owing to the reduced thickness and the presence of the second pores of 1 μm or more, the purge performance using air can be enhanced.

(Configuration)

The configuration of the method for producing adsorbent according to the present invention is further characterized in that the additive material is at least one of a phase change material having a phase change temperature of 35° C. or lower and a phase transition material having a phase transition temperature of 35° C. or lower.

According to the above characteristic configuration, the adsorbent whose adsorption performance and purge performance are improved as described above can be obtained.

(Configuration)

The configuration of the method for producing adsorbent according to the present invention is further characterized in that the mass of the additive material is not less than 0.05 times and not more than 0.3 times the mass of the activated carbon.

According to the above characteristic configuration, by using the phase change material and the phase transition material as the additive material, the adsorption performance and the purge performance can be improved.

(Configuration)

The configuration of the method for producing adsorbent according to the present invention is further characterized in that the kneaded mixture contains an inorganic binder, and the meltable cores are present in an amount of not less than 10 mass % and not more than 45 mass % with respect to the total mass of the activated carbon and the inorganic binder.

According to the above characteristic configuration, by adjusting the amount of the meltable cores with respect to the total mass of the activated carbon and the inorganic binder to the above-described range, the purge performance can be improved while increasing the rate of adsorption and desorption.

(Configuration)

The configuration of the method for producing adsorbent according to the present invention is further characterized in that the mass of the additive material is not less than 0.42 times and not more than 3.0 times the mass of the activated carbon.

The additive material suppresses heat generation of the activated carbon during adsorption of fuel vapor to improve the adsorption performance of the adsorbent, and also suppresses a decrease in the temperature of the activated carbon during purging of the adsorbed fuel to improve the purge performance. According to the above characteristic configuration, when at least a portion of the parts of the hollow adsorbent has a thickness of not less than 0.2 mm and less than 0.6 mm, the lower limit of the mass of the additive material can be set to a small value of about 0.42 times the mass of the activated carbon. By setting the thickness of at least a portion of the adsorbent to fall within the range of not less than 0.2 mm and less than 0.6 mm, even if the lower limit of the ratio of the added additive material to the activated carbon is set to a small value, the adsorption performance and the purge performance can still be improved, whereby the DBL performance can be improved.

(Configuration)

The configuration of the method for producing adsorbent according to the present invention is further characterized in that the mass of the additive material is not less than 0.42 times and less than 1.5 times the mass of the activated carbon. The method for producing adsorbent is further characterized in that the mass of the additive material is not less than 0.42 times and not more than 1.0 times the mass of the activated carbon.

(Configuration)

The configuration of the method for producing adsorbent according to the present invention is further characterized in that the pore volume of the first pores in the adsorbent is less than 0.8 ml/g, and the ratio of the volume of the second pores to the volume of the first pores is not less than 10% and not more than 90%.

When at least a portion of the parts of the hollow adsorbent has a thickness of not less than 0.2 mm and less than 0.6 mm, the upper limit of the pore volume of the first pores of less than 100 nm can be set to less than 0.8 ml/g as in the above characteristic configuration. Since fuel vapor flows through the spaces formed by the respective parts of the adsorbent in a manner as described above, the adsorption performance for, for example, butane and the like in the fuel vapor and the purge performance by the first and second pores formed in the adsorbent can be improved. By setting the thickness of at least a portion of the adsorbent to fall within the range of not less than 0.2 mm and less than 0.6 mm, even if the upper limit of the pore volume of the first pores is set to a large value of less than 0.8 ml/g and the adsorption performance for molecules of butane and the like in fuel vapor by the first pores is thus made high, the purge performance and the DBL performance can still be improved owing to the small thickness. The reason for this is considered to be that, since the thickness of at least a portion of the adsorbent is in the range of not less than 0.2 mm and less than 0.6 mm, the purge performance using air can be improved owing to this small thickness.

It should be noted that, if the pore volume of the first pores is 0.8 ml/g or more when the thickness of at least a portion of the adsorbent is not less than 0.2 mm and less than 0.6 mm, the butane working capacity (BWC) as determined according to a BWC evaluation method specified in ASTM D5228 is too large, whereby the purge performance is deteriorated. As a result, the DBL performance is deteriorated.

Further, since the purge performance is improved when the pore volume of the first pores is less than 0.8 ml/g as described above, the ratio of the volume of the second pores to the volume of the first pores can be set relatively small with the lower limit thereof being 10% or more.

(Configuration)

The configuration of the method for producing adsorbent according to the present invention is further characterized in that the adsorbent contains an inorganic binder, and the meltable cores are present in an amount of not less than 5 mass % and not more than 45 mass % with respect to the total mass of the activated carbon and the inorganic binder.

By adjusting the amount of the meltable cores with respect to the total mass of the activated carbon and the inorganic binder to the above-described range, the purge performance can be improved while increasing the rate of adsorption and desorption. By setting the thickness of at least a portion of the adsorbent to fall within the range of not less than 0.2 mm and less than 0.6 mm, even if the lower limit of the ratio of the meltable cores with respect to the total mass of the activated carbon and the inorganic binder is set to a small value of 5 mass % or more, the purge performance and the DBL performance can still be improved because the thickness of the adsorbent is small.

When the ratio of the meltable cores is less than 5 mass % with respect to the total mass, the proportion of the second pores of 1 μm or more in the adsorbent is too low, and the flow of fuel vapor and air is thus hindered. Accordingly, a sufficiently fast rate of adsorption and desorption and sufficient purge performance cannot be attained. On the other hand, when the ratio of the meltable cores is more than 45 mass % with respect to the total mass, the proportion of the second pores of 1 μm or more in the adsorbent is high, and this results in reduced strength and deteriorated adsorption performance. In addition, the hardness of the adsorbent is reduced.

(Configuration)

The configuration of the method for producing adsorbent according to the present invention is further characterized in that the BWC of the adsorbent as determined according to a BWC evaluation method specified in ASTM D5228 is not less than 6.0 g/dL and less than 11.0 g/dL.

According to the above characteristic configuration, since the adsorbent exhibits a large BWC, i.e., a large effective adsorption capacity for butane, the adsorption performance of the adsorbent can be enhanced. Accordingly, the adsorbent can be made smaller and lighter. Also, by setting the thickness of at least a portion of the adsorbent to fall within the range of not less than 0.2 mm and less than 0.6 mm, the upper limit of the BWC can be set to a relatively large value of less than 11.0 g/dL.

BRIEF DESCRIPTION OF THE DRAWINGS

FIG. 4 is a perspective view showing the shape of still another adsorbent.

DESCRIPTION OF THE INVENTION

Embodiment

A canister according to the present embodiment and an adsorbent to be used in the canister will be described below. In the present embodiment, the canister is used for treating fuel vapor released from a fuel tank of an automobile. The adsorbent is packed into this canister.

Fuel vapor generated when the temperature of the fuel tank rises, e.g., while the engine is being driven or the vehicle is not moving, is prevented from being diffused into the atmosphere through adsorption of the fuel vapor on the adsorbent packed into the canister. The fuel vapor adsorbed on the adsorbent is desorbed (purged) utilizing a negative pressure of an air intake pipe during the driving of the engine or a suction pump that is driven and controlled independently from the driving of the engine, whereby the adsorbent is regenerated.

(1) Configuration of Adsorbent

First, the configuration of an adsorbent will be described with reference to FIG. 1.

Figure 1:
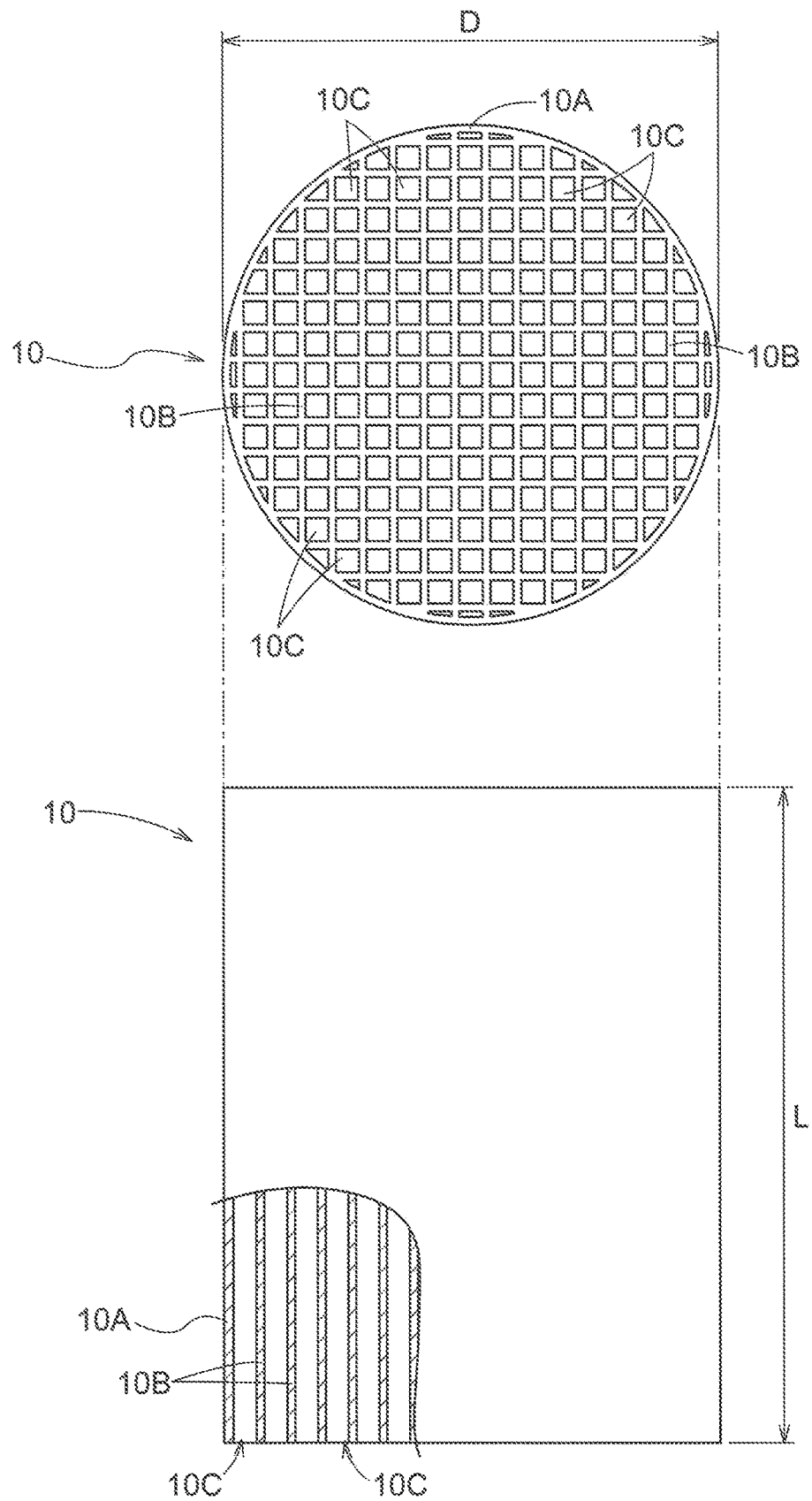
FIG. 1 shows a top view and side view showing the shape of an adsorbent.

As shown in FIG. 1, an adsorbent 10 of the present embodiment is in the form of a hollow molded body that includes a cylindrical wall 10A forming the outer periphery and honeycomb walls 10B that constitute a honeycomb pattern inside the cylindrical wall 10A. The honeycomb walls 10B divide a space inside the cylindrical wall 10A into segments in a honeycomb pattern when viewed from the top, thereby forming a plurality of spaces 10C. The cylindrical wall 10A and the honeycomb walls 10B extend in the longitudinal direction (the height direction when viewed from the side). As a result, the plurality of spaces 10C segmented in a honeycomb pattern are formed extending in the longitudinal direction. In the adsorbent 10 having the above-described honeycomb shape, fuel vapor and air used during purging flow smoothly through the hollow regions, whereby the contact time, the contact area, and the like between the activated carbon as a component of the adsorbent 10 and the fuel vapor are increased. As a result, the adsorption performance and the purge performance can be improved.

The outer diameter D of the adsorbent 10 is more than 6 mm and not more than 50 mm, and the length L of the adsorbent 10 in the longitudinal direction is not more than 200 mm. The cylindrical wall 10A and the honeycomb walls 10B each have a thickness of not less than 0.2 mm and not more than 1 mm. The adsorbent 10 having a honeycomb shape in which the outer diameter D and the length L are relatively large may be referred to simply as a "honeycomb", whereas the adsorbent 10 having a honeycomb shape in which the outer diameter D and the length L are relatively small may be referred to as a "honeycomb pellet". In the present embodiment, the cylindrical wall 10A and the honeycomb walls 10B preferably have a thickness of not less than 0.6 mm and not more than 1 mm.

The adsorbent 10 is formed using a raw material at least containing activated carbon having pores (first pores to be described below), meltable cores, an additive material, and a binder.

The adsorbent 10 is produced in the following manner. The above-described raw material containing the activated carbon, the meltable cores, the additive material, and the binder are mixed with water and kneaded using a mixer such as a ribbon mixer, for example. Then, the material thus kneaded is molded into the honeycomb shape shown in FIG. 1 through extrusion molding, mold molding, or the like. Thereafter, the molded material is dried at a temperature of about 200° C. or lower using infrared rays, hot air, steam, microwaves, or the like. Subsequently, the material is fired using a belt kiln or the like at a temperature from 650° C. to 1000° C. for 30 mmutes to 4 hours in an inert gas atmosphere. In this manner, the adsorbent 10 is produced.

Through the heating of the molded material during the above-described firing and the like, pores (second pores to be described below) are formed in the adsorbent 10 as spaces that have remained after sublimation of the meltable cores or decomposition and volatilization of the meltable cores.

The above-described drying process, which is performed at a relatively low temperature of about 200° C. or lower, may be, for example, a step of removing moisture at the time of molding or/and a step of causing sublimation of a sublimable substance such as the meltable cores. The above-described firing process, which is performed at a relatively high temperature of 650° C. to 1000° C., may be, for example, a step of removing moisture at the time of molding, a step of causing sublimation of a sublimable substance such as the meltable cores, or/and a step of hardening an inorganic binder (to be described below) contained in the binder.

The activated carbon may be powdered activated carbon having a particle diameter of 350 μm or less (powdered activated carbon that passes through a 42-mesh sieve), obtained by pulverizing commercially available coal-based activated carbon, wood-based activated carbon, or the like. The activated carbon is formed porous and has first pores of less than 100 nm in size. The activated carbon usually has a specific surface area of 500 to 2500 $m^2/g$ and preferably has a specific surface area of 1000 to 2000 $m^2/g$. The specific surface area of the activated carbon to be selected can be appropriately selected according to the BWC value of the adsorbent and the amount of the activated carbon blended in the adsorbent.

In the following, the butane working capacity (BWC) is an evaluation value for evaluating the adsorption performance for butane as determined according to a BWC evaluation method specified in ASTM D5228.

As the meltable cores, those made of a material that has a high melting point and is easily decomposed are used. The meltable cores used in the present embodiment are fibrous meltable cores, which are made of, for examples, a polymer that has a high melting point and is easily decomposed, such as polyester, polypropylene, pulp fibers, amide fibers, or cellulose fibers.

The fibrous meltable cores have a diameter of 1.0 μm or more. Preferably, the fibrous meltable cores have a diameter of 100 μm or less and a length of less than 1 mm. Preferably, the fibrous meltable cores have a diameter of 50 μm or less and a length of not less than 0.1 mm and not more than 0.5 mm. More preferably, the fibrous meltable cores have a diameter of 40 μm or less and a length of 0.3 mm or less.

As described above, the raw material containing the activated carbon, the meltable cores, the additive material, and the binder is kneaded and subjected to the processes including the firing process, whereby the second pores are formed as a result of sublimation of the meltable cores. Since the second pores are formed through sublimation of the meltable cores or through decomposition and volatilization of the meltable cores, the diameter and the length of the thus-formed second pores are approximately the same as those of the fibrous meltable cores. That is, the second pores are 1 μm or more in size. Also, a preferable pore diameter and a preferable length of the second pores are approximately the same as those of the fibrous meltable core.

The "pore diameter" as used herein means the average pore diameter, and is determined by measuring an adsorption-desorption isotherm according to a nitrogen adsorption-desorption measurement method or by mercury intrusion porosimetry, for example. In this embodiment, the pore diameter is measured using mercury intrusion porosimetry. In addition to these methods, the pore diameter can also be determined through particle size analysis using a SEM.

Since the meltable core-derived second pores formed in this manner are relatively large and also have a length in the predetermined range, fuel vapor flows smoothly through the second pores, whereby the adsorption performance and the purge performance can be improved.

When the meltable cores have a diameter of less than 1.0 μm, the flow of fuel vapor and the flow of air during purging are not smooth. This lowers the rate of desorption, resulting in deteriorated purge performance. On the other hand, when the meltable cores satisfy at least one of a diameter of more than 100 μm and a length of 1 mm or more, the volume of the second pores present in the framework of the adsorbent 10 is large, whereby the hardness of the adsorbent 10 is reduced.

When the meltable cores are pulp fibers, the meltable cores preferably have a length of 0.5 mm or less.

Preferably, the meltable cores have C—N bonds. When the meltable cores having C—N bonds, the activated carbon, the additive material, and the like are kneaded and heated to form the adsorbent 10, the C—N bonds in the meltable cores are cleaved through the heating, thereby allowing the meltable cores to be easily decomposed or volatilized. As a result, second pores derived from the fibrous meltable cores having C—N bonds can be formed in the adsorbent 10. Moreover, owing to the presence of the C—N bonds, blockage of the second pores by a carbide formed during the heating can be suppressed.

The above-described molded body of the adsorbent 10 has pores formed therein, which include the first pores that belong to the activated carbon and are less than 100 nm and the second pores that are derived from the meltable cores and are 1 μm or more. More specifically, as shown in FIG. 1, the molded body of the adsorbent 10 has a framework constituted by the cylindrical wall 10A and the honeycomb walls 10B. The cylindrical wall 10A and the honeycomb walls 10B are formed using the raw material containing the activated carbon, the meltable cores, the additive material, and the binder and have the first pores that are derived from the activated carbon and are less than 100 nm and the second pores that are derived from the meltable cores and are 1 μm or more. In the adsorbent 10 with such a configuration, for example, butane and the like in fuel vapor can be captured on the molecular level by the first pores of less than 100 nm, whereby the adsorption performance can be enhanced. Moreover, the second pores of 1 μm or more serve as passages through which fuel vapor flows, and this allows the purge performance to be enhanced.

In addition to the above-described pores, the cylindrical wall 10A and the honeycomb walls 10B may further include pores formed through sublimation of the binder (in particular, an organic binder) during heating.

As the additive material, it is preferable to use a material that has a higher heat capacity than the activated carbon. For example, as the additive material, it is preferable to use a substance that has a higher volumetric specific heat than the activated carbon. Further, as the additive material, it is preferable to use a substance that has a higher thermal conductivity than the activated carbon. The additive material used in the present embodiment is a material that has a higher volumetric specific heat and a higher thermal conductivity than the activated carbon, and is, for example, a metal oxide, which generally has a higher volumetric specific heat and a higher thermal conductivity than the activated carbon. The metal oxide is an oxide of aluminum or iron, for example. The metal oxide preferably has a volumetric specific heat of 0.4 kcal/L·° C. or more and a thermal conductivity of 0.5 kcal/m·h·° C. or more. Also, the metal oxide preferably has a specific heat of 0.25 to 0.4 kcal/kg·° C. or more. It should be noted that the activated carbon has, for example, a volumetric specific heat of 0.05 to kcal/L·° C. and a thermal conductivity of 0.064 kcal/m·h·° C.

As described above, the adsorbent 10 contains, in addition to the activated carbon, a metal oxide that has a higher heat capacity per volume and a higher thermal conductivity than the activated carbon. The adsorbent 10 containing the metal oxide as described above preferably has a volumetric specific heat of 0.08 kcal/L·° C. or more. Also, the adsorbent 10 containing the above-described metal oxide preferably has a thermal conductivity of 0.1 kcal/m·h·° C. or more. The volume specific heat of the adsorbent 10 is more preferably 0.12 kcal/L·° C. or more and still more preferably more than 0.12 kcal/L·° C. The adsorbent 10 preferably has a specific heat of 0.2 kcal/kg·° C. or more, for example. With this configuration, the function of the adsorbent 10 to transfer heat generated by the activated carbon to the metal oxide during adsorption of fuel vapor is improved. As a result, an increase in the temperature of the activated carbon is suppressed, whereby the adsorption performance of the adsorbent 10 is improved. On the other hand, the function of the activated carbon to take the heat retained in the metal oxide during purging of the adsorbed fuel is improved. As a result, a decrease in the temperature of the activated carbon is suppressed, whereby the purge performance of the adsorbent 10 is improved. In particular, by using a metal oxide that has a higher volumetric specific heat and a higher thermal conductivity than the activated carbon as the additive material as described above, the adsorption performance and the purge performance can be improved.

In the adsorbent 10, the mass of the metal oxide as the additive material is preferably not less than 1.0 times and not more than 3.0 times the mass of the activated carbon. That is, the raw material contains the metal oxide having a higher heat capacity and a higher thermal conductivity than the activated carbon in an amount from 1.0 to 3.0 times the mass of the activated carbon, and the adsorbent 10 is formed using such a raw material. With this configuration, an increase and a decrease in the temperature of the adsorbent 10 can be suppressed, whereby the adsorption performance and the purge performance can be improved. When the mass of the metal oxide is less than 1.0 times the mass of the activated carbon, the temperature control effect is low, whereby the purge performance is deteriorated. On the other hand, when the mass of the metal oxide is more than 3.0 times the mass of the activated carbon, the proportion of the activated carbon is reduced, whereby the adsorption performance is deteriorated.

More preferably, the mass of the metal oxide is from 1.5 to 2.5 times the mass of the activated carbon.

The additive material need only have a higher volumetric specific heat and a higher thermal conductivity than the activated carbon. The additive material is not limited to metal oxides and may be inorganic oxides such as silicon.

An inorganic binder and an organic binder are used as the binder.

As the inorganic binder, a powder or a solid content of sol, such as powdered bentonite, Kibushi clay, silica sol, alumina sol, or white clay, is used. The amount of such an inorganic binder to be added is about 10 to 50 mass % with respect to the total mass of the raw material used for producing the adsorbent 10, containing the activated carbon, the meltable cores, the additive material, and the binder.

In the present embodiment, the firing step is performed to produce the adsorbent 10. Accordingly, as the organic binder, an organic binder commonly used for molding a honeycomb can be used. As the organic binder, for example, carboxymethyl cellulose, methyl cellulose, hydroxypropyl methyl cellulose, hydroxyethyl methyl cellulose, or the like can be used. The amount of such an organic binder to be added is about 3 to 10 mass % with respect to the total mass of the raw material used for producing the adsorbent 10.

The adsorbent 10 formed using the above-described raw material containing the activated carbon, the meltable cores, the additive material, and the binder has pores formed therein, which include the first pores that belong to the activated carbon and are less than 100 nm and the second pores that are derived from the meltable cores and are 1 μm or more, as described above. Preferably, the ratio of the volume of the second pores to the volume of the first pores is not less than 10% and not more than 200%. When the ratio is less than 10%, the rate of desorption of fuel vapor is slow, and accordingly, the improvement in the purge performance is suppressed. On the other hand, when the ratio is more than 200%, the ratio of the first pores of less than 100 nm, which contribute to the adsorption of fuel vapor, is low, and this incurs the deterioration of the adsorption performance. Accordingly, by setting the ratio of the volume of the second pores to the volume of the first pores to not less than 10% and not more than 200%, the adsorption performance and the purge performance can be improved. As a result, the diurnal breathing loss (DBL) performance is improved. Note here that the DBL performance is performance expressed by the amount of breakthrough emission of fuel vapor released from a fuel tank through an adsorbent during parking of a vehicle.

The ratio of the volume of the second pores to the volume of the first pores is preferably not less than 10% and not more than 170%, more preferably not less than 30% and not more than 130%, and still more preferably not less than 50% and not more than 100%.

As described above, the adsorbent 10 of the embodiment is in a hollow shape that has an outer diameter of more than 6 mm and in which respective parts have a thickness in the predetermined range. Accordingly, the first pores and the second pores can have large volumes in this framework. As a result, the adsorption performance and the purge performance are improved, whereby the DBL performance is improved. On the other hand, although the outer diameter of the adsorbent 10 is not more than 50 mm, the adsorbent 10 has the constituent features such as the presence of the first pores of less than 100 nm and the second pores of 1 μm or more, the ratio of the volume of the second pores to the volume of the first pores, and the addition of the metal oxide to the adsorbent, as described above. With this configuration, while reducing the size of the adsorbent 10, the adsorption performance and the purge performance can be improved, whereby the DBL performance can be improved. In addition, the hardness of the adsorbent 10 is also improved.

It is preferable to set the mass of the metal oxide as the additive material to not less than 1.0 times and not more than 3.0 times the mass of the activated carbon in the raw material as described above, because an increase and a decrease in the temperature of the adsorbent 10 is suppressed, whereby the adsorption performance and the purge performance can be improved. When the ratio of the metal oxide is increased, the proportion of the activated carbon in the adsorbent 10 becomes low, whereby the ratio of the first pores of less than 100 nm is reduced. As a result, the adsorption performance may be deteriorated. However, the deterioration of the adsorption performance can be suppressed by adjusting the ratio of the volume of the second pores to the volume of the first pores to not less than 10% and not more than 200% and by forming the adsorbent 10 in a hollow shape having an outer diameter of more than 6 mm and not more than 50 mm as described above.

Also, it is preferable that the pore volume of the first pores in the adsorbent 10 be less than 0.55 ml/g and that the ratio of the volume of the second pores to the volume of the first pores be not less than 20% and not more than 90%. The "pore volume" of the first pores as used herein refers to the volume of all the first pores included in the molded body that constitutes the framework of the adsorbent 10. The same applies to the pore volume of the second pores. Since the pore volume of the first pores of less than 100 nm is less than 0.55 ml/g, the adsorption performance for molecules of butane and the like in fuel vapor by the first pores is prevented from being excessively high, whereby the purge performance is improved. When the pore volume of the first pores is 0.55 ml/g or more, the BWC increases, resulting in deteriorated purge performance. As a result, the DBL performance is deteriorated. The pore volume of the first pores of less than 100 nm preferably is less than 0.45 ml/g, more preferably 0.42 ml/g or less, and still more preferably 0.4 ml/g or less.

Moreover, since the purge performance is improved by setting the pore volume of the first pores to less than 0.55 ml/g as described above, the ratio of the volume of the second pores to the volume of the first pores can be set relatively small, namely, to not less than 20% and not more than 90%.

Further, it is preferable that the second pores in a framework of the molded body constituting the adsorbent 10 be present in a proportion of not less than 5 vol % and not more than 40 vol % of the framework. The framework of the molded body constituting the adsorbent 10 refers to, in FIG. 1, the cylindrical wall 10A and the honeycomb walls 10B, which both include the first pore derived from the activated carbon and the second pores derived from the meltable cores. Accordingly, the proportion of the second pores included in the framework with respect to the volume of the framework constituted by the cylindrical wall 10A and the honeycomb walls 10B, which both include the first pores and the second pores, is preferably not less than 5 vol % and not more than 40 vol %.

By adjusting the proportion of the second pores in the framework of the molded body of the adsorbent 10 to the above-described range, the contact time, the contact area, and the like of the first pores of the activated carbon with fuel vapor and with air used during purging are increased, whereby the purge performance can be improved while increasing the rate of adsorption and desorption. When the proportion of the second pores in the framework is less than 5 vol %, the proportion of the second pores of 1 μm or more in the framework of the adsorbent 10 is too low, and the flow of fuel vapor is thus hindered. Accordingly, a sufficiently fast rate of adsorption and desorption and sufficient purge performance cannot be attained. On the other hand, when the proportion of the second pores in the framework is more than 40 vol %, the proportion of the second pores of 1 μm or more in the framework of the adsorbent 10 is high, and this results in reduced strength and deteriorated adsorption performance.

It is more preferable that the second pores in the framework of the molded body constituting the adsorbent 10 be present in a proportion of not less than 5 vol % and not more than 35 vol % of the framework and more preferably not less than 10 vol % and not more than 30 vol %.

In the raw material, the meltable cores are preferably present in an amount of not less than 5 mass % and not more than 45 mass % with respect to the total mass of the activated carbon and the inorganic binder.

By adjusting the amount of the meltable cores with respect to the total mass of the activated carbon and the inorganic binder in the raw material to the above-described range, the purge performance can be improved while increasing the rate of adsorption and desorption. When the ratio of the meltable cores is less than 5 mass % with respect to the total mass, the proportion of the second pores of 1 μm or more in the adsorbent 10 is too low, and flow of fuel vapor and flow of air are thus hindered. Accordingly, a sufficiently fast rate of adsorption and desorption and sufficient purge performance cannot be attained. On the other hand, when the ratio of the meltable cores is more than 45 mass % with respect to the total mass, the proportion of the second pores of 1 μm or more in the adsorbent 10 is high, and this results in deteriorated adsorption performance. Also, the hardness of the adsorbent 10 is reduced.

The adsorbent 10 is preferably configured such that the difference in equilibrium adsorption capacity versus n-butane concentration is more than 35 g/L between an n-butane concentration of 5 vol % and an n-butane concentration of 50 vol %. In this case, the adsorbent 10 exhibits a large effective adsorption capacity for molecules of butane and the like in fuel vapor and thus can exhibits enhanced adsorption performance. Moreover, since the adsorbent 10 has high adsorption performance, the adsorbent 10 can be made smaller and lighter.

Preferably, the BWC of the adsorbent 10 as determined according to a BWC evaluation method specified in ASTM D5228 is not less than 6.0 g/dL and less than 9.7 g/dL. In this case, since the adsorbent exhibits a large BWC, i.e., a large effective adsorption capacity for butane, the adsorption performance of the adsorbent can be enhanced. Accordingly, the adsorbent can be made smaller and lighter.

The adsorbent 10 is preferably configured such that an amount of residual butane as determined after causing the adsorbent 10 to adsorb and then desorb butane according to a BWC evaluation method specified in ASTM D5228 is less than 1.7 g/dL. The adsorbent 10 exhibits an amount of residual butane of less than 1.7 g/dL, and thus is excellent in purge performance.

The second pores of 1 μm or more preferably have an average diameter of not less than 1 μm and not more than 100 μm. The second pores, which are derived from the fibrous meltable cores, have an average pore diameter of not less than 1 μm and not more than 100 μm, and thus can suppress reduction in hardness of the adsorbent 10. When the average diameter of the second pores is more than 100 μm, the second pores in the adsorbent 10 is too large to allow the adsorbent 10 to maintain its hardness, and the adsorbent 10 is not applicable to practical use.

The average diameter of the second pores is preferably not less than 5 μm and not more than 100 μm, more preferably less than not less than 5 μm and not more than 50 μm, and still more preferably not less than 10 μm and not more than 50 μm.

(2) Examples and Comparative Examples of Adsorbent

An adsorbent according to Example 1 and adsorbents according to Comparative Examples 1 to 3 were produced, and these adsorbents yielded the results shown in Table 1.

In Example 1 and Comparative Examples 1 to 3, the following components were used in predetermined amounts shown in Table 1.

Activated carbon: pulverized BAX 1500 (INGEVITY)
Organic binder: HPC (hydroxypropyl methyl cellulose)
Inorganic binder: bentonite
Meltable cores: fibrous cellulose
Metal oxide: iron oxide In Comparative Example 1, a coconut shell carbide was used as a carbide.

TABLE 1

|  | Ex. 1 | Comp. Ex. 1 | Comp. Ex. 2 | Comp. Ex. 3 | Comp. Ex. 4 | Comp. Ex. 5 |
|---|---|---|---|---|---|---|
| Shape | honeycomb | honeycomb | honeycomb | honeycomb | honeycomb | honeycomb |
| diameter × height (mm) | 35 × 100 | 35 × 150 | 35 × 100 | 35 × 100 | 35 × 100 | 35 × 100 |
| Activated carbon (parts by mass) | 18 | 28 | 25 | 25 | 18 | 42 |
| Organic binder (parts by mass) | 7 | 15 | 7 | 7 | 7 | 7 |
| Inorganic binder (parts by mass) | 17 | 40 | 35 | 35 | 17 | 17 |
| Meltable cores (parts by mass) | 8 | 0 | 0 | 10 | 15 | 8 |
| Metal oxide (parts by mass) | 42 | 0 | 0 | 0 | 42 | 42 |
| Carbide (parts by mass) | 0 | 32 | 0 | 0 | 0 | 0 |
| Phase transition material (parts by mass) | 0 | 0 | 0 | 0 | 0 | 0 |
| Phase change material (parts by mass) | 0 | 0 | 0 | 0 | 0 | 5 |
| BWC (g/dL) | 6.3 | 4.7 | 7.1 | 6.8 | 6.3 | 9.7 |
| Difference in equilibrium adsorption capacity between 5 vol % butane concentration and 50 vol % butane concentration (g/L) | 40 | 16 | 45 | 42 | 40 | 63 |
| Ratio of volume of second pores to volume of first pores (%) | 84 | 15 | 13 | 100 | 210 | 38 |
| Pore volume of first pores (ml/g) | 0.34 | 0.54 | 0.53 | 0.53 | 0.34 | 0.77 |
| Ratio of pore volume of second pores to volume of framework of adsorbent (%) | 21 | 1 | 2 | 22 | 41 | 14 |

TABLE 1-continued

|  | Ex. 1 | Comp. Ex. 1 | Comp. Ex. 2 | Comp. Ex. 3 | Comp. Ex. 4 | Comp. Ex. 5 |
| --- | --- | --- | --- | --- | --- | --- |
| Amount of residual butane (g/dL) | 1.0 | 0.8 | 1.0 | 0.9 | 0.4 | 1.8 |
| Average diameter of second pores (μm) | 15 | less than 1 | less than 1 | 15 | 15 | 15 |
| Purge performance (purge efficiency) (%) | 88 | 83 | 65 | 72 | 95 | 71 |
| DBL performance (amount of breakthrough emission) | Excellent | Good | Poor | Average | Excellent | Average |
| Hardness | Good | Good | Good | Good | Poor | Good |

The DBL performance shown in Table 1 was evaluated in the following manner.

According to the Bleed Emission Test Procedure (BETP) in the United States, the DBL performance was determined based on the purge volume at which a canister had a DBL emission of less than 20 mg.

"Excellent" indicates a case where the two-day DBL emission was less than 20 mg when not more than 100 BV of purge (the purge volume was 100 times the volume of the canister) was applied after a 40 g/hr butane loading step.

"Good" indicates a case where the two-day DBL emission was less than 20 mg when not more than 157 BV of purge (the purge volume was 157 times the volume of the canister) was applied after a 40 g/hr butane loading step.

"Average" indicates a case where the two-day DBL emission was less than 20 mg when not more than 210 BV of purge (the purge volume was 210 times the volume of the canister) was applied after a 40 g/hr butane loading step.

"Poor" indicates a case where the two-day DBL emission was 20 mg or more when not more than 210 BV of purge (the purge volume was 210 times the volume of the canister) was applied after a 40 g/hr butane loading step.

The adsorbent of Example 1 was produced using a raw material containing 8 parts by mass of the fibrous meltable cores and 42 parts by mass of the metal oxide. The adsorbent of Example 1 had a thickness (the thickness of the cylindrical wall 10A and the honeycomb walls 10B) of 0.60 mm. In this case, the adsorbent had a large BWC of 6.3 g/dL, a small amount of residual butane of 1.0 g/dL, and excellent DBL performance evaluated as "Excellent". Also, the adsorbent maintained its hardness.

In the raw material of the adsorbent of Example 1, the fibrous meltable cores are contained in an amount of 22.9 mass % with respect to the total mass of the activated carbon and the inorganic binder.

In the raw material of the adsorbent of Example 1, the mass of the metal oxide is 2.3 times the mass of the activated carbon.

The adsorbent of Comparative Example 1 was produced using a raw material not containing either fibrous meltable cores or a metal oxide, and the thickness thereof was the same as that of the adsorbent of Example 1. In this case, the adsorbent exhibited a small BWC of 4.7 g/dL, which indicates that the adsorbent has low adsorption performance. The adsorbent of Comparative Example 1 is longer than the adsorbent of Example 1, and thus has a larger volume than the adsorbent of Example 1. However, the adsorbent of Comparative Example 1 exhibited a smaller BWC that the adsorbent of Example 1. In addition, the DBL performance in Comparative Example 1 was evaluated as "Good", which is inferior to the DBL performance in Example 1. Although the adsorbent of Comparative Example 1 had a small amount of residual butane of 0.8 g/dL, it is considered that the amount of residual butane was small because the adsorption amount of butane was small owing to the low adsorption performance. From these results, it can be seen that the adsorbent of Comparative Example 1 had low adsorption performance, low DBL performance, and the like despite a relatively large volume thereof, and thus is not capable of attaining reduction in size and weight.

The adsorbent of Comparative Example 2 was produced using a raw material not containing either fibrous meltable cores or a metal oxide, and the thickness thereof was the same as that of the adsorbent of Example 1. Although the adsorbent of Comparative Example 2 had a large BWC of 7.1 g/dL, the DBL performance thereof was evaluated as "Poor". It can be seen from these results that, when an adsorbent produced using a raw material not containing either fibrous meltable cores or a metal oxide has a relatively large BWC, the DBL performance is deteriorated.

The adsorbent of Comparative Example 3 was produced using a material containing 10 parts by mass of the fibrous meltable cores and not containing a metal oxide, and the thickness thereof was the same as that of the adsorbent of Example 1. Although the adsorbent of Comparative Example 3 had a large BWC of 6.8 g/dL, the DBL performance thereof was evaluated as "Average". It can be seen from these results that, when an adsorbent produced using a raw material not containing a metal oxide has a relatively large BWC, the DBL performance is deteriorated. The amount of fibrous meltable cores used in Comparative Example 3 was larger than that in Example 1. However, the DBL performance in Comparative Example 3 was inferior to the DBL performance in Example 1.

The adsorbent of Comparative Example 4 was produced using a raw material containing the fibrous meltable cores and the metal oxide, and the amount of the meltable cores was 15 parts by mass, which is larger than those in Examples 1 and 2. The thickness of the adsorbent of Comparative Example 4 was the same as that of the adsorbent of Example 1. Accordingly, the adsorbent of Comparative Example 4 had a relatively large number of second pores derived from the fibrous meltable cores. The results indicate that, although the DBL performance was evaluated as "Excellent", the hardness was low.

The adsorbent of Comparative Example 5 was produced using a raw material containing the fibrous meltable cores and the metal oxide, and the amount of the activated carbon was 42 parts by mass, which is larger than that in Example 1. The thickness of the adsorbent of Comparative Example 5 was the same as that of the adsorbent of Example 1. Owing to the large content of the activated carbon, the adsorbent of Comparative Example 5 exhibited a large BWC of 9.7 g/dL. However, owing to the high adsorption performance, the purge performance was poor and the DBL performance was evaluated as "Average".

In Comparative Example 5, the pore volume of first pores of less than 100 nm is 0.77 ml/g. Since the adsorbent of Comparative Example 5 was produced using the raw material containing the fibrous meltable cores and the metal oxide, it was expected that the purge performance and the temperature suppressing effect would be improved. However, the adsorbent of Comparative Example 5 exhibited inferior DBL performance evaluated as "Average". From the comparison of the pore volume of the first pores in Comparative Example 5 with those in Example 1 and Comparative Examples 1 to 4, it can be seen that, while the pore volumes of the first pores are 0.34 ml/g, 0.54 ml/g, 0.53 ml/g, 0.53 ml/g, and 0.34 ml/g in Example 1 and Comparative Examples 1 to 4, respectively, the pore volume of the first pores in Comparative Example 5 is 0.55 ml/g or more. Accordingly, it can be seen that, when the pore volume of first pores in an adsorbent is 0.55 ml/g or more, the DBL performance cannot be improved even if the raw material of the adsorbent contains fibrous meltable cores and a metal oxide.

It is to be noted that the adsorbents of Example 1 and Comparative Examples 4 and 5, which contain the metal oxide, all satisfy a volumetric specific heat of 0.08 kcal/L·° C. or more and a thermal conductivity of 0.1 kcal/m·h·° C. or more. In contrast, the adsorbents of Comparative Examples 1 to 3 do not satisfy at least one of a volumetric specific heat of 0.08 kcal/L·° C. or more and a thermal conductivity of 0.1 kcal/m·h·° C. or more.

(3) Configuration of Canister

Figure 2:
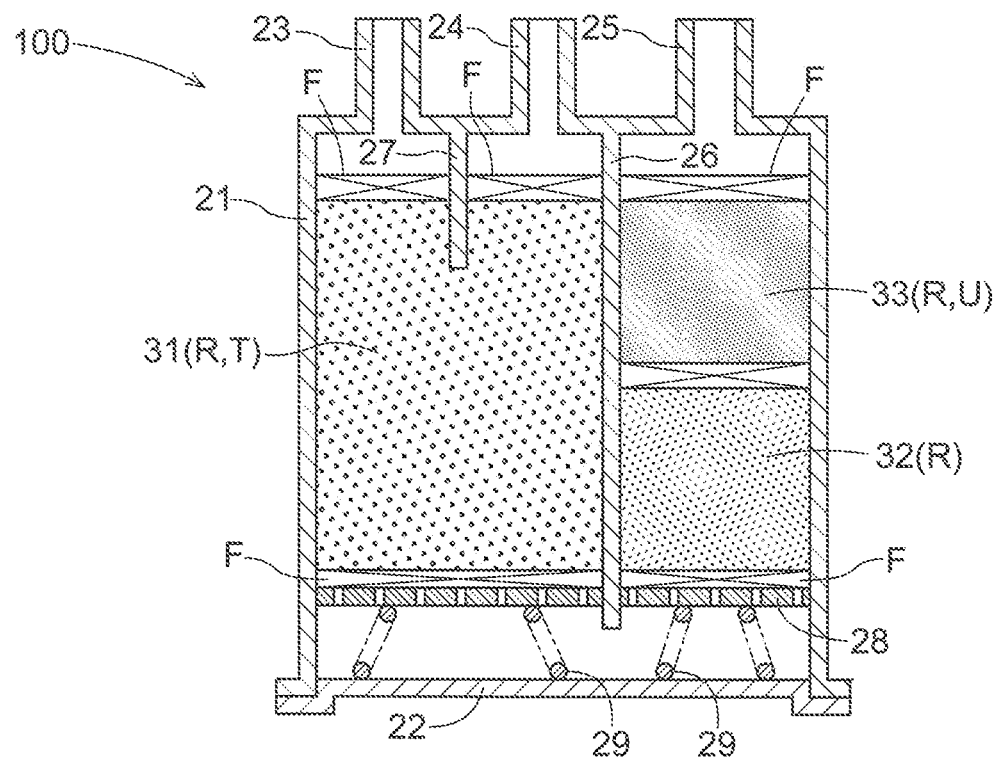
FIG. 2 is a schematic cross-sectional view showing the structure of a canister.

FIG. 2 shows a cross-sectional view of a canister 100 according to the first embodiment. The canister 100 is installed for treating fuel vapor released from a fuel tank of an automobile. The canister 100 includes a case 21, a cover 22, a plate 28, coil springs 29, and filters F. An adsorbent chamber R is formed inside the canister 100, and an adsorbent 10 produced in the above-described manner is contained in the adsorbent chamber R.

The case 21 is a hollow cylindrical member made of a synthetic resin (for example, nylon) and whose bottom is open. The cover 22 is a disc-shaped member made of a synthetic resin (for example, nylon). The cover 22 is bonded to the lower side of the case 21 through vibration welding or with an adhesive, for example, to close the opening of the case 21.

A tank port 23, a purge port 24, and an atmospheric port 25 are formed on the upper side of the case 21. The tank port 23 is in communication with an upper part of a fuel tank (not shown) of an automobile, and fuel vapor released from the fuel tank flows into the case 21 through the tank port 23. The purge port 24 is in communication with an air intake path (not shown) of an internal combustion engine. The air intake path is in communication with an air intake pipe of the internal combustion engine, or is connected to a suction pump that is driven and controlled independently from driving of the engine. The atmospheric port 25 is open to the atmosphere, and atmospheric air flows into the case 21 through the atmospheric port 25.

A partition wall 26 and an auxiliary partition wall 27 are formed inside the case 21. The partition wall 26 extends from an internal upper end of the case 21 to the vicinity of the cover 22, and is provided at a position between the purge port 24 and the atmospheric port 25. The auxiliary partition wall 27 is a short partition wall that extends from the internal upper end of the case 21 toward the cover 22, and is provided at a position between the tank port 23 and the purge port 24.

The space inside the case 21 is divided into right and left spaces by the partition wall 26. The space on the right in FIG. 2 (the space on the atmospheric port 25 side) is divided into upper and lower spaces by one of the filters F. The lower space (the space on the cover 22 side) provided in the space on the atmospheric port 25 side is referred to as a second region 32, and the upper space (the space on the atmospheric port 25 side) is referred to as a third region 33. The space on the tank port 23 side partitioned by the partition wall 26 is referred to as a first region 31. In the present embodiment, the above-described adsorbent 10 is disposed in the third region 33, and activated carbon is disposed in the first region 31 and the second region 32.

The filter F disposed between the first region 31 and the second region 32 is non-woven fabric made of a synthetic resin or a filter made of foamed urethane, and is configured such that fuel vapor and air can pass therethrough. The plate 28 is disposed in lower portions of the first region 31 and the second region 32. The plate 28 is a metal plate that has a large number of through holes, and is configured such that fuel vapor and air can pass therethrough. The plate 28 is biased upward by the coil springs 29, whereby the adsorbent 10 and the activated carbon contained in the first region 31, the second region 32, and the third region 33 are compressed upward.

With the configuration described above, a U-shaped flow path that extends between the tank port 23 (and the purge port 24) and the atmospheric port 25 is formed inside the canister 100. Fuel vapor from the tank port 23 first flows into the first region 31, passes under the plate 28 to flow into the second region 32, and then flows into the third region 33. The first region 31, the second region 32, and the third region 33 are regions where the fuel vapor that flows from the tank port 23 to the atmospheric port 25 is adsorbed, and the activated carbon and the adsorbent 10 are contained in these regions. Hereinafter, these regions may be collectively referred to as the adsorbent chamber R. The first region 31 is adjacent to the tank port 23, and may also be referred to as a tank-side adjacent region T. The third region 33 is adjacent to the atmospheric port 25, and may also be referred to as an atmosphere-side adjacent region U.

As described above, in the present embodiment, the above-described adsorbent 10 is disposed in the atmosphere-side adjacent region U, which is the third region 33. The desorption (purge) of fuel vapor from the activated carbon contained in the adsorbent 10 is performed by drawing air through the purge port 24 to cause atmospheric air to flow into the canister 100 through the atmospheric port 25. Since heat is taken from the activated carbon during desorption of fuel vapor from the activated carbon, the temperature of the activated carbon drops, whereby the purge performance of the activated carbon is deteriorated. The deterioration of the purge performance becomes serious when the temperature of the activated carbon is lower than 10° C. According to the above configuration, since the above-described adsorbent 10 is disposed in the atmosphere-side adjacent region U provided adjacent to the atmospheric port 25 in the adsorbent chamber R, an excessive decrease in the temperature of the activated carbon contained in the adsorbent 10 disposed in the atmosphere-side adjacent region U is suppressed, and this allows purging to be performed appropriately.

Although the above-described adsorbent 10 is disposed in the atmosphere-side adjacent region U in the present embodiment, the above-described adsorbent 10 may also be disposed in the tank-side adjacent region T.

Other Embodiments

The constituent features disclosed in the above embodiment (including other embodiments, the same applies hereinafter) may be used in combination with constituent features disclosed in other embodiments, unless mutual contradiction arises. Also, the embodiments disclosed herein are merely illustrative, and the embodiments of the present invention are not limited thereto and can be modified as appropriate without departing from the object of the present invention.

(1) In the above embodiment, a metal oxide is used as an additive material in order to suppress an increase in the temperature of activated carbon during adsorption of fuel vapor and to suppress a decrease in the temperature of the activated carbon during purging of the adsorbed fuel. However, at least one of a phase change material and a phase transition material other than metal oxides also can be used as the additive material. The following description is mainly directed to differences between the present modified example and the above embodiment, and redundant explanations are omitted or simplified.

An adsorbent in this modified example is formed using a raw material that contains activated carbon having first pores, meltable cores, at least one of a phase change material and a phase transition material, an organic binder, an inorganic binder, and a carbide (the carbide serves as a filler BWC modifier and a hardness enhancer) such as a coconut shell carbide. As the additive material, at least one of a phase change material and a phase transition material is used instead of the metal oxide used in the adsorbent 10 of the above embodiment. The phase change material and the phase transition material have a higher heat capacity than the activated carbon, and they are added in such a manner that the adsorbent 10 has a volumetric specific heat of 0.08 kcal/L·° C. or more at the phase change temperature of the phase change material and the phase transition temperature of the phase transition material.

The above-described phase change material and phase transition material are substances whose phase changes and transits at a predetermined phase change temperature and a predetermined phase transition temperature, respectively, and they bring about the same effects as the above-described metal oxide. That is, since heat generated by the activated carbon during adsorption of fuel vapor is transferred to the phase transition material, an increase in the temperature of the activated carbon is suppressed, whereby the adsorption performance of the adsorbent 10 is improved. On the other hand, during purging of the adsorbed fuel, the activated carbon takes the heat retained in the phase transition material. As a result, a decrease in the temperature of the activated carbon is suppressed, whereby the purge performance of the adsorbent 10 is improved.

Also, in combination with the fact that the phase change material and the phase transition material have a relatively high latent heat, the adsorbent containing at least one of the phase change material and the phase transition material as described above can have improved adsorption performance and improved purge performance.

The phase change temperature of the phase change material and the phase transition temperature of the phase transition material are preferably 35° C. or lower. The phase change material and the phase transition material are preferably in the form of capsules.

The phase change material is not particularly limited as long as it is a substance whose phase can change between the solid phase and the liquid phase in response to a change in temperature of the activated carbon, and an organic compound or an inorganic compound can be used as the phase change material. Specific examples of the phase change material include: linear aliphatic hydrocarbons such as tetradecane, pentadecane, hexadecane, heptadecane, octadecane, nonadecan, eicosane, henicosane, and docosane; natural waxes and petroleum waxes; hydrates of inorganic compounds, such as $LiNO_3 \cdot 3H_2O$, $Na_2SO_4 \cdot 10H_2O$, and $Na_2HPO_4 \cdot 12H_2O$; fatty acids such as capric acid, lauric acid, palmitic acid, and myristic acid; higher alcohols having 12 to 15 carbon atoms; and ester compounds such as methyl palmitate, methyl stearate, isopropyl palmitate, butyl stearate, stearyl stearate, and myristyl myristate.

Accordingly, in the case where a phase change material is used, the volumetric specific heat of the adsorbent 10 at the phase change temperature can be set to 0.08 kcal/L·° C. or more by appropriately selecting the type and the added amount of the phase change material.

On the other hand, the phase transition material may be, for example, an alloy of vanadium dioxide and tungsten ($V_XW_YO_2$) (X+Y=1). In Example 2 to be described below, an alloy of vanadium dioxide and tungsten in which X=0.98 (98 parts by mass) and Y=0.02 (2 parts by mass) was used ($V_{0.98}W_{0.02}O_2$). In this case, the phase transition temperature of the phase transition material ($V_{0.98}W_{0.02}O_2$) is 20° C., and the volumetric specific heat of the adsorbent 10 at the phase transition temperature of this phase transition material can be set to 0.08 kcal/L·° C. or more.

In the above-described alloy of vanadium dioxide and tungsten as the phase transition material, the phase transition temperature can be adjusted a temperature higher than 20° C. by reducing Y (the content of tungsten) to be smaller than Y=0.02 (2 parts by mass). Furthermore, by reducing Y (the content of tungsten), the phase transition temperature can also be adjusted to a temperature that is higher than 20° C. and not higher than 35° C. On the contrary, by increasing Y (tungsten content ratio) to be larger than Y=0.02 (2 parts by mass), the phase transition temperature can be adjusted to a temperature lower than 20° C. By adjusting Y (the contain of tungsten) as described above, the volumetric specific heat of the adsorbent 10 at the phase transition temperature can be set to 0.08 kcal/L·° C. or more. Also, in the case where a phase transition material is used, the volumetric specific heat of the adsorbent 10 at the phase transition temperature can be set to 0.08 kcal/L·° C. or more by appropriately selecting the type of the phase transition material, and the amount of the phase transition material to be added to the adsorbent 10.

In the raw material, the mass of at least one of the phase change material and the phase transition material is preferably not less than 0.05 times and not more than 0.3 times the mass of the activated carbon.

Since heat is taken from the activated carbon during desorption of fuel vapor from the activated carbon, the temperature of the activated carbon drops, whereby the purge performance of the activated carbon is deteriorated. The deterioration of the purge performance becomes serious when the temperature of the activated carbon is lower than 10° C. Since the above-described adsorbent contains the additive material such as the phase change material having a phase change temperature of 35° C. or lower and the phase transition material having a phase transition temperature of 35° C. or lower, an excessive decrease in the temperature of the activated carbon contained in the adsorbent is suppressed, and this allows purging to be performed appropriately.

Also, by setting the ratio of the phase change material, the phase transition material, and the like to be added to not less than 0.05 times and not more than 0.3 times the mass of the activated carbon, the temperature of the activated carbon can be adjusted to an appropriate temperature. When the ratio is less than 0.05 times, for example, the effect of suppressing an excessive decrease in the temperature of the activated carbon by the phase change material, the phase transition material, and the like cannot be obtained sufficiently. On the other hand, when the ratio is more than 0.3 times, the proportion of the activated carbon in the adsorbent is reduced by the phase change material, the phase transition material, and the like added to the adsorbent, whereby the adsorption performance is deteriorated.

The adsorbent of this modified example is formed using a raw material that contains activated carbon having first pores, meltable cores, at least one of a phase change material and a phase transition material, an organic binder, and a carbide. These components of the raw material are mixed and kneaded using a mixer such as a ribbon mixer, for example. Then, the material thus kneaded is molded into the honeycomb shape shown in FIG. 1 through extrusion molding, mold molding, or the like. Thereafter, the molded material is dried at a temperature that is equal to or lower than the decomposition temperature of the capsules of the phase change material and the like and equal to or higher than the decomposition temperature of the meltable cores using infrared rays, hot air, steam, microwaves, or the like. In this manner, adsorbent is obtained.

The adsorbent according to this modified example can be disposed in the atmosphere-side adjacent region U, which is the third region 33. With this configuration, an excessive decrease in the temperature of the activated carbon contained in the adsorbent in the atmosphere-side adjacent region U is suppressed, and this allows purging to be performed appropriately.

An adsorbent according to Example 2 was produced using a phase transition material as the above-described additive material, and an adsorbent according to Example 3 was produced using a phase change material as the above-described additive material. These adsorbents yielded the results shown in Table 2.

In Examples 2 and 3, the following components were used in predetermined amounts shown in Table 2.

Activated carbon: pulverized BAX 1500 (INGEVITY)
Organic binder: HPC (hydroxypropyl methyl cellulose)
Inorganic binder: bentonite In Example 2, an alloy of vanadium dioxide and tungsten ($V_{0.98}W_{0.02}O_2$), which is a phase transition material, was used as the additive material. The phase transition temperature of this alloy is 20° C., and the volumetric specific heat of the adsorbent 10 is 0.08 kcal/L·° C. or more at the phase transition temperature of the phase transition material. In Example 2, fibrous cellulose was used as meltable cores.

The additive material used in Example 3 was microcapsules having a primary particle size of 4 mm and containing hexadecane as the phase change material. The phase change temperature of this phase change material is about 18° C., and the volumetric specific heat of the adsorbent 10 is 0.08 kcal/L·° C. or more at the phase change temperature of the phase change material. In Example 3, naphthalene was used as meltable cores, and an inorganic binder was not contained. Further, in Examples 2 and 3, a coconut shell carbide was used as a carbide.

TABLE 2

| | Example 2 | Example 3 |
|---|---|---|
| Shape | honeycomb | honeycomb |
| diameter × height (mm) | 35 × 100 | 35 × 100 |
| Activated carbon (parts by mass) | 18 | 18 |
| Organic binder (parts by mass) | 7 | 9 |
| Inorganic binder (parts by mass) | 17 | 0 |
| Meltable cores (parts by mass) | 8 | 8 |
| Metal oxide (parts by mass) | 0 | 0 |
| Carbide (parts by mass) | 36 | 51 |
| Phase transition material (parts by mass) | 5 | 0 |
| Phase change material (parts by mass) | 0 | 5 |
| BWC (g/dL) | 6.3 | 6.2 |
| Difference in equilibrium adsorption capacity between 5 vol % butane concentration and 50 vol % butane concentration (g/L) | 40 | 38 |
| Ratio of volume of second pores to volume of first pores (%) | 86 | 90 |
| Pore volume of first pores (ml/g) | 0.33 | 0.31 |
| Ratio of pore volume of second pores to volume of framework of adsorbent (%) | 19 | 23 |
| Amount of residual butane (g/dL) | 1.1 | 1.0 |
| Average diameter of second pores (μm) | 14 | 5 |
| Purge performance (purge efficiency) (%) | 89 | 89 |
| DBL performance (amount of breakthrough emission) | Excellent | Excellent |
| Hardness | Good | Good |

The respective performances including the DBL performance shown in Table 2 were evaluated in the same manner as those shown in Table 1.

The adsorbent of Example 2 was produced using a raw material containing 8 parts by mass of the fibrous meltable cores and 5 parts by mass of the phase transition material. The thickness of the adsorbent of Example 2 was the same as that of the adsorbent of Example 1 (the thickness [the thickness of a cylindrical wall 10A and honeycomb walls 10B] was 0.60 mm). In this case, the adsorbent had a large BWC of 6.3 g/dL, a small amount of residual butane of 1.1 g/dL, and excellent DBL performance evaluated as "Excellent". Also, the adsorbent maintained its hardness.

In the raw material of the adsorbent of Example 2, the mass of the phase transition material is 0.28 times the mass of the activated carbon.

The raw material of the adsorbent of Example 2 contains 36 parts by mass of the carbide (coconut shell carbide).

The adsorbent of Example 3 was produced using a raw material containing 8 parts by mass of naphthalene as fibrous meltable cores and 5 parts by mass of the phase change material. The thickness of the adsorbent of Example 3 was the same as that of the adsorbent of Example 1. In this case, the adsorbent had a large BWC of 6.2 g/dL, a small amount of residual butane of 1.0 g/dL, and excellent DBL performance evaluated as "Excellent". Also, the adsorbent maintained its hardness.

In the raw material of the adsorbent of Example 3, the mass of the phase change material is 0.28 times the mass of the activated carbon.

The raw material of the adsorbent of Example 3 contains 51 parts by mass of the carbide (coconut shell carbide).

The adsorbents of Examples 2 and 3 contain roughly equivalent parts by mass of the activated carbon and meltable cores as those in the adsorbent of Example 1. The adsorbents of Examples 2 and 3 contain, instead of the metal oxide in the adsorbent of Example 1, the phase transition material and the phase change material, respectively.

The results shown in Table 2 indicate that the adsorbents of Examples 2 and 3 configured as above also had improved adsorption performance and improved purge performance, similarly to the adsorbent of Example 1.

(2) In the above embodiment, the cylindrical wall 10A forming the outer periphery and the honeycomb walls 10B of the adsorbent 10 shown in FIG. 1 have a thickness of not less than 0.2 mm and not more than 1 mm. The present modified example describes an adsorbent 10 of FIG. 1 configured such that honeycomb walls 10B have a thickness of not less than 0.2 mm and less than 0.6 mm. The following description is mainly directed to differences between the present modified example and the above embodiment, and redundant explanations are omitted or simplified.

In the present modified example, the thickness of the honeycomb walls 10B of the adsorbent 10 is set to not less than 0.2 mm and less than 0.6 mm, and these honeycomb walls 10B provide a plurality of spaces 10C forming the hollow shape of the adsorbent 10 shown in FIG. 1.

One adsorbent 10 according to the present modified example is obtained by designing the adsorbent 10 shown in FIG. 1 (the outer diameter D is more than 6 mm) to have honeycomb walls 10B having a thickness falling within a range of not less than 0.2 mm and less than 1.0 mm. In this adsorbent 10, the thickness of the honeycomb walls 10B is set to 0.8 mm, for example. Further, the other adsorbent 10 according to the present modified example is designed such that the shape and the outer diameter D are the same as those of the above-described one adsorbent 10 and the thickness of honeycomb walls 10B falls within a range of not less than 0.2 mm and less than 0.6 mm. In the other adsorbent 10, the thickness of the honeycomb walls 10B is set to 0.4 mm, for example.

In this case, although the one adsorbent 10 and the other adsorbent 10 have the same shape and the same outer diameter D, the thickness of the honeycomb walls 10B of the other adsorbent 10 (for example, 0.4 mm) is smaller than the thickness of the honeycomb walls 10B of the one adsorbent 10 (for example, 0.8 mm). Accordingly, each of the spaces 10C in the other adsorbent 10 as viewed in the fuel vapor flow direction (the upper diagram in FIG. 1) has a larger area than each of the spaces 10C in the one adsorbent 10. By setting the thickness of the honeycomb walls 10B to fall within the range of not less than 0.2 mm and less than 0.6 mm as described above, the spaces 10C can be relatively large, and accordingly, fuel vapor can flow smoothly through the spaces 10C in the adsorbent 10. In addition, the purge performance can be improved owing to the reduced thickness.

Owing to the smooth flow of fuel vapor through the spaces 10C, the contact of the fuel vapor with the first pores that belong to the activated carbon and are less than 100 nm and with the second pores that are derived from the meltable cores and are 1 μm or more can be promoted. Accordingly, for example, butane and the like in fuel vapor can be captured on the molecular level by the first pores of less than 100 nm, whereby the adsorption performance can be enhanced. Also, owing to the reduced thickness and the presence of the second pores of 1 μm or more, the purge performance using air can be enhanced. Thus, the adsorption performance and the purge performance can be improved, whereby the DBL performance is improved.

In the adsorbent 10 of the above embodiment, the mass of a metal oxide as the additive material is set to not less than 1.0 times and not more than 3.0 times the mass of activated carbon. In the modified example in which the honeycomb walls 10B have a thickness of not less than 0.2 mm and less than 0.6 mm, it is preferable to set the mass of a metal oxide as the additive material to not less than 0.42 times and not more than 3.0 times the mass of the activated carbon.

As described in the above embodiment, the additive material suppresses heat generation of the activated carbon during adsorption of fuel vapor to improve the adsorption performance of the adsorbent, and also suppresses a decrease in the temperature of the activated carbon during purging of the adsorbed fuel to improve the purge performance. When the thickness of the honeycomb walls 10B of the adsorbent 10 is not less than 0.2 mm and less than 0.6 mm as in the present modified example, even if the lower limit of the ratio of the added metal oxide to the activated carbon is set to a relatively small value of about 0.42 times the mass of the activated carbon, the adsorption performance and the purge performance can still be improved, whereby the DBL performance can be improved. In the above embodiment, the cylindrical wall 10A and the honeycomb walls 10B of the adsorbent 10 have a thickness of not less than 0.2 mm and not more than 1.0 mm, and the lower limit of the ratio of the added metal oxide to the activated carbon in the adsorbent 10 is 1.0 times the mass of the activated carbon, which is larger than that in the present modified example.

Preferably, the mass of the additive material is not less than 0.42 times and less than 1.5 times the mass of the activated carbon. More preferably, the mass of the additive material is not less than 0.42 times and not more than 1.0 times the mass of the activated carbon.

In the adsorbent 10 in which the thickness of the honeycomb walls 10B is not less than 0.2 mm and less than 0.6 mm, it is preferable that the pore volume of the first pores included in the adsorbent 10 be less than 0.8 ml/g and that the ratio of the volume of the second pores to the volume of the first pores be not less than 10% and not more than 90%. The "pore volume" of the first pores as used herein refers to the volume of all the first pores included in the molded body that constitutes the framework of the adsorbent 10. The same applies to the pore volume of the second pores.

When at least a portion of the parts of the adsorbent 10 has a thickness of not less than 0.2 mm and less than 0.6 mm as described above, the upper limit of the pore volume of the first pores of less than 100 nm can be set to less than 0.8 ml/g. Since fuel vapor flows through the spaces 10C formed by the honeycomb walls 10B of the adsorbent 10 in a manner as described above, the adsorption performance for, for example, butane and the like in the fuel vapor and the purge performance by the first and second pores formed in the adsorbent 10 can be improved. By setting the thickness of the honeycomb walls 10B of the adsorbent 10 to fall within the range of not less than 0.2 mm and less than 0.6 mm, even if the upper limit of the pore volume of the first pores is set to a large value of less than 0.8 ml/g and the adsorption performance for molecules of butane and the like in fuel vapor by the first pores is thus made high, the purge performance and the DBL performance can still be improved owing to the small thickness. The reason for this is considered to be that, since the thickness of at least a portion of the adsorbent 10 is in the range of not less than 0.2 mm and less than 0.6 mm, i.e., the thickness the honeycomb walls 10B of the adsorbent 10 is small, the purge performance using air can be improved.

It should be noted that, if the pore volume of the first pores is 0.8 ml/g or more when the thickness of the honeycomb walls 10B of the adsorbent 10 is not less than 0.2 mm and less than 0.6 mm, the butane working capacity (BWC) as determined according to a BWC evaluation method specified in ASTM D5228 is too large, whereby the purge performance is deteriorated. As a result, the DBL performance is deteriorated.

Further, since the purge performance is improved when the pore volume of the first pores is less than 0.8 ml/g as described above, the ratio of the volume of the second pores to the volume of the first pores can be set relatively small with the lower limit thereof being 10% or more.

Preferably, the upper limit of the ratio of the volume of the second pores to the volume of the first pores can be set to 70% or less. More preferably, the upper limit can be set to 50% or less. Still more preferably, the upper limit can be set to 25% or less.

The raw material of the adsorbent 10 contains an inorganic binder. In the adsorbent 10 in which the thickness of the honeycomb walls 10B is not less than 0.2 mm and less than 0.6 mm, the meltable cores are present preferably in an amount of not less than 5 mass % and not more than 45 mass % with respect to the total mass of the activated carbon and the inorganic binder.

By adjusting the amount of the meltable cores with respect to the total mass of the activated carbon and the inorganic binder in the raw material to the above-described range, the purge performance can be improved while increasing the rate of adsorption and desorption. By setting the thickness of the honeycomb walls 10B of the adsorbent 10 to fall within the range of not less than 0.2 mm and less than 0.6 mm, even if the lower limit of the ratio of the meltable cores with respect to the total mass of the activated carbon and the inorganic binder is set to a small value of 5 mass % or more, the purge performance and the DBL performance can still be improved because the thickness of the adsorbent is small.

When the ratio of the meltable cores is less than 5 mass % with respect to the total mass, the proportion of the second pores of 1 μm or more in the adsorbent 10 is too low, and the flow of fuel vapor and air is thus hindered. Accordingly, a sufficiently fast rate of adsorption and desorption and sufficient purge performance cannot be attained. On the other hand, when the ratio of the meltable cores is more than 45 mass % with respect to the total mass, the proportion of the second pores of 1 μm or more in the adsorbent 10 is high, and this results in reduced strength and deteriorated adsorption performance. In addition, the hardness of the adsorbent 10 is reduced.

Preferably, the upper limit of the ratio of the meltable cores with respect to the above-described total mass can be set to 30% or less. More preferably, the upper limit can be set to 20% or less. Still more preferably, the upper limit can be set to 10% or less.

In the adsorbent 10 in which the thickness of the honeycomb walls 10B is not less than 0.2 mm and less than 0.6 mm, the BWC as determined according to a BWC evaluation method specified in ASTM D5228 is preferably not less than 6.0 g/dL and less than 11.0 g/dL.

Since the adsorbent 10 exhibits a large BWC, i.e., a large effective adsorption capacity for butane, the adsorption performance of the adsorbent 10 can be enhanced. Accordingly, the adsorbent 10 can be made smaller and lighter. Also, by setting the thickness of the adsorbent 10 to fall within the range of not less than 0.2 mm and less than 0.6 mm, the upper limit of the BWC can be set to a relatively large value of less than 11.0 g/dL.

Preferably, the lower limit of the BWC can be set to 7.0 g/dL or more. More preferably, the lower limit can be set to 8.0 g/dL or more.

Although the thickness of the honeycomb walls 10B is set to not less than 0.2 mm and less than 0.6 mm in the above, at least one of the thickness of the honeycomb walls 10B and the thickness of the cylindrical wall 10A may be set to not less than 0.2 mm and less than 0.6 mm.

That is, the thickness of the honeycomb walls 10B may be set to not less than 0.2 mm and less than 0.6 mm, and the thickness of the cylindrical wall 10A may also be set to be not less than 0.2 mm and less than 0.6 mm. When the thickness of the honeycomb walls 10B and the thickness of the cylindrical wall 10A are both set to not less than 0.2 mm and less than 0.6 mm, the same effects as described above can also be obtained.

Alternatively, the thickness of the cylindrical wall 10A may be set to not less than 0.2 mm and less than 0.6 mm, and the thickness of the honeycomb walls 10B may be set to not less than 0.2 mm and less than 1.0 mm. In this case, the same effects as described above can also be obtained.

Moreover, the thickness of at least a portion of the cylindrical wall 10A and the honeycomb walls 10B may be set to not less than 0.2 mm and less than 0.6 mm. For example, the thickness of at least a portion of the cylindrical wall 10A may be set to not less than 0.2 mm and less than 0.6 mm. Alternatively, for example, the thickness of at least a portion of the honeycomb walls 10B may be set to not less than 0.2 mm and less than 0.6 mm. Also, for example, the thickness of at least a portion of the cylindrical wall 10A and the thickness of at least a portion of the honeycomb walls 10B may be set to not less than 0.2 mm and less than 0.6 mm. In these cases, the same effects as described above can also be obtained. In order to obtain the same effects as described above, the proportion of the portion(s) whose thickness is to be set to not less than 0.2 mm and less than 0.6 mm in the whole parts (the honeycomb walls 10B and the cylindrical wall 10A) is preferably adjusted as appropriate.

As the adsorbent 10 according to the present modified example, adsorbents according to Examples 4 to 8 and Comparative Example 6 were produced, and these adsorbents yielded the results shown in Table 3. In the adsorbents according to Examples 4 to 8 and Comparative Example 6, the thickness of a cylindrical wall 10A is set to 0.60 mm and the thickness of honeycomb walls 10B is set to 0.50 mm.

In Examples 4 to 8 and Comparative Example 6, the following components were used in predetermined amounts shown in Table 3.

Activated carbon: pulverized activated carbon whose BWC as determined according to a BWC evaluation method specified in ASTM D5228 is 14 g/dL Organic binder: HPC (hydroxypropyl methyl cellulose)

Inorganic binder: bentonite

Meltable cores: fibrous cellulose

Metal oxide: iron oxide

The respective performances including the DBL performance shown in Table 3 were evaluated in the same manner as those shown in Table 1.

TABLE 3

|  | Ex. 4 | Ex. 5 | Ex. 6 | Ex. 7 | Ex. 8 | Comp. Ex. 6 |
|---|---|---|---|---|---|---|
| Shape | honeycomb | honeycomb | honeycomb | honeycomb | honeycomb | honeycomb |
| diameter × height (mm) | 35 × 100 | 35 × 150 | 35 × 100 | 35 × 100 | 35 × 100 | 35 × 100 |
| Activated carbon (parts by mass) | 45 | 47 | 50 | 40 | 80 | 95 |
| Organic binder (parts by mass) | 7 | 7 | 7 | 8 | 11 | 11 |
| Inorganic binder (parts by mass) | 16 | 16 | 16 | 15 | 25 | 28 |
| Meltable cores (parts by mass) | 5 | 4 | 4 | 6 | 6 | 6 |
| Metal oxide (parts by mass) | 28 | 26 | 24 | 39 | 39 | 39 |
| Carbide (parts by mass) | 0 | 0 | 0 | 0 | 0 | 0 |
| Phase transition material (parts by mass) | 0 | 0 | 0 | 0 | 0 | 0 |
| Phase change material (parts by mass) | 0 | 0 | 0 | 0 | 0 | 0 |
| BWC (g/dL) | 9.6 | 9.8 | 10.3 | 8.7 | 10.4 | 11 |
| Difference in equilibrium adsorption capacity between 5 vol % butane concentration and 50 vol % butane concentration (g/L) | 45 | 46 | 48 | 39 | 49 | 52 |
| Ratio of volume of second pores to volume of first pores (%) | 20 | 17 | 15 | 23 | 12 | 9 |
| Pore volume of first pores (ml/g) | 0.65 | 0.67 | 0.70 | 0.55 | 0.74 | 0.76 |
| Ratio of pore volume of second pores to volume of framework of adsorbent (%) | 7 | 6 | 5 | 8 | 4 | 4 |
| Amount of residual butane (g/dL) | 1.1 | 1.1 | 1.1 | 1.0 | 1.3 | 1.7 |
| Average diameter of second pores (μm) | 15 | 15 | 15 | 15 | 15 | 15 |
| Purge performance (purge efficiency) (%) | 89 | 89 | 88 | 90 | 87 | 85 |
| DBL performance (amount of breakthrough emission) | Excellent | Good | Good | Excellent | Good | Poor |
| Hardness | Good | Good | Good | Good | Good | Good |

The adsorbent of Example 4 was produced using a raw material containing 45 parts by mass of the activated carbon and 28 parts by mass of the metal oxide. In this case, the mass of the metal oxide is 0.62 (28/45) times the mass of the activated carbon.

The pore volume of the first pores is 0.65 ml/g, and the ratio of the volume of the second pores to the volume of the first pores is 20%.

The meltable cores are present in an amount of 8 mass % (5/(45+16)×100) with respect to the total mass of the activated carbon and the inorganic binder.

In Example 4, the adsorbent had a large BWC of 9.6 g/dL, a small amount of residual butane of 1.1 g/dL, and excellent DBL performance evaluated as "Excellent". Also, the adsorbent maintained its hardness.

The adsorbent of Example 5 was produced using a raw material containing 47 parts by mass of the activated carbon and 26 parts by mass of the metal oxide. In this case, the mass of the metal oxide is 0.55 (26/47) times the mass of the activated carbon.

The pore volume of the first pores is 0.67 ml/g, and the ratio of the volume of the second pores to the volume of the first pores is 17%.

The meltable cores are present in an amount of 6 mass % (4/(47+16)×100) with respect to the total mass of the activated carbon and the inorganic binder.

In Example 5, the adsorbent had a large BWC of 9.8 g/dL, a small amount of residual butane of 1.1 g/dL, and good DBL performance evaluated as "Good". Also, the adsorbent maintained its hardness.

The adsorbent of Example 6 was produced using a raw material containing 50 parts by mass of the activated carbon and 24 parts by mass of the metal oxide. In this case, the mass of the metal oxide is 0.48 (24/50) times the mass of the activated carbon.

The pore volume of the first pores is 0.70 ml/g, and the ratio of the volume of the second pores to the volume of the first pores is 15%.

The meltable cores are present in an amount of 6 mass % (4/(50+16)×100) with respect to the total mass of the activated carbon and the inorganic binder.

In Example 6, the adsorbent had a large BWC of 10.3 g/dL, a small amount of residual butane of 1.1 g/dL, and good DBL performance evaluated as "Good". Also, the adsorbent maintained its hardness.

The adsorbent of Example 7 was produced using a raw material containing 40 parts by mass of the activated carbon and 39 parts by mass of the metal oxide. In this case, the mass of the metal oxide is 0.98 (39/40) times the mass of the activated carbon.

The pore volume of the first pores is 0.55 ml/g, and the ratio of the volume of the second pores to the volume of the first pores is 23%.

The meltable cores are present in an amount of 10 mass % (6/(80+25)×100) with respect to the total mass of the activated carbon and the inorganic binder.

In Example 7, the adsorbent had a large BWC of 8.7 g/dL, a small amount of residual butane of 1.0 g/dL, and excellent DBL performance evaluated as "Excellent". Also, the adsorbent maintained its hardness.

The adsorbent of Example 8 was produced using a raw material containing 80 parts by mass of the activated carbon and 39 parts by mass of the metal oxide. In this case, the mass of the metal oxide is 0.49 (39/80) times the mass of the activated carbon.

The pore volume of the first pores is 0.74 ml/g, and the ratio of the volume of the second pores to the volume of the first pores is 12%.

The meltable cores are present in an amount of 6 mass % (6/(80+25)×100) with respect to the total mass of the activated carbon and the inorganic binder.

In Example 8, the adsorbent had a large BWC of 10.4 g/dL, a small amount of residual butane of 1.3 g/dL, and good DBL performance evaluated as "Good". Also, the adsorbent maintained its hardness.

The adsorbent of Comparative Example 6 was produced using a raw material containing 95 parts by mass of the activated carbon and 39 parts by mass of the metal oxide. In this case, the mass of the metal oxide is 0.41 (39/95) times the mass of the activated carbon.

The pore volume of the first pores is 0.76 ml/g, and the ratio of the volume of the second pores to the volume of the first pores is 9%.

The meltable cores are present in an amount of 5 mass % (6/(95+28)×100) with respect to the total mass of the activated carbon and the inorganic binder.

In Comparative Example 6, the adsorbent had a BWC of 11 g/dL, an amount of residual butane of 1.7 g/dL, and poor DBL performance evaluated as "Poor".

In each of the adsorbents of Examples 4 to 8 (the wall thickness of the cylindrical wall 10A is 0.6 mm and the wall thickness of the honeycomb walls 10B is 0.5 mm), the metal oxide as the additive material is present in an amount of not less than 0.42 times and less than 1.0 times with respect to the activated carbon on a mass basis. With this configuration, the adsorbents of Examples 4 to 8 in which the thickness of the honeycomb walls 10B is 0.5 mm (falling within the range of not less than 0.2 mm and less than 0.6 mm) each exhibited a large BWC from 9.6 to 10.4 g/dL. Alto, the adsorbents of Examples 4 to 8 each exhibited a small amount of residual butane from 1.0 to 1.3. Moreover, the adsorbents of Examples 4 to 8 each had relatively good DBL performance evaluated as "Excellent" or "Good".

On the other hand, in the adsorbent of Example 1 in which the thickness of the cylindrical wall 10A is 0.6 mm, the thickness of the honeycomb walls 10B is 0.6 mm, and the additive material is the metal oxide, the metal oxide is contained in an amount of 2.3 times (42/18) the amount of the activated carbon. The adsorbent of Example 1 exhibited a BWC of 6.3 g/dL, an amount of residual butane of 1.0, and excellent DBL performance evaluated as "Excellent".

The proportion of the metal oxide contained in the adsorbents of each of Examples 4 to 8 is smaller than the proportion of the metal oxide contained in the adsorbent of Example 1. However, the performances of the adsorbents of Examples 4 to 8 including the BWC, the amount of residual butane, the DBL performance, and the hardness are not inferior to those of the adsorbent of Example 1 and the like.

Accordingly, in the case where the thickness of adsorbent is reduced, that is, in the case where the thickness of the honeycomb walls 10B is reduced as in the present examples, even if the proportion of the metal oxide contained in the adsorbent is low, the adsorbent can still exhibit favorable performances such as BWC, the amount of residual butane, the DBL performance, and the hardness.

From the comparison between Comparative Example 5 corresponding to the above embodiment and Example 7 corresponding to the present modified example, it can be seen that the adsorbent of Example 7 as the modified example is superior to the adsorbent of Comparative Example 5. That is, in Comparative Example 5 as the above embodiment (the thickness of the cylindrical wall 10A is 0.6 mm and the thickness of the honeycomb walls 10B is 0.6 mm), the amount of the metal oxide contained as the additive material is 1.0 (42/42) times the amount of the activated carbon on a mass basis. In contrast, in Example 7 as the present modified example (the thickness of the cylindrical wall 10A is 0.6 mm and the thickness of the honeycomb walls 10B is 0.5 mm), the amount of the metal oxide contained as the additive material is 0.98 (39/40) times the amount of the activated carbon on a mass basis. Although the ratio of the metal oxide to the active carbon is approximately the same in Comparative Example 5 and Example 7, the performances such as the BWC, the amount of residual butane, and the DBL performance in Example 7 are superior to those in Comparative Example 5. These results indicate that, when the thickness of adsorbent is reduced, that is, when the thickness of the honeycomb walls 10B is reduced as in the present example, even if the proportion of the metal oxide contained in the adsorbent is low (0.98 times in Example 7), the adsorbent can still exhibit favorable performances such as BWC, the amount of residual butane, the DBL performance, and the like.

(3) In the above embodiment, the adsorbent 10 is disposed in the atmosphere-side adjacent region U. However, an adsorbent to be described in the following may be disposed in the tank-side adjacent region T.

An adsorbent according to the present modified example preferably uses activated carbon whose BWC as determined according to a BWC evaluation method specified in ASTM D5228 is 15.0 g/dL or more.

The adsorbent contains the activated carbon whose BWC as determined according to a BWC evaluation method specified in ASTM D5228 is 15.0 g/dL or more and an additive material that is at least one of a phase change material having a phase change temperature of 36° C. or higher and a phase transition material having a phase transition temperature of 36° C. or higher.

According to the above-described configuration, the adsorbent containing the additive material such as a phase change material and the like that absorbs and releases latent heat in response to a change in temperature is disposed in the tank-side adjacent region T in the adsorbent chamber R. Accordingly, the change in temperature of the activated carbon is suppressed by the adsorbent, whereby deterioration of the performance of the activated carbon can be prevented.

When feeding fuel to the fuel tank, a large amount of fuel vapor may flow into the canister 100 at one time. The fuel vapor that has flowed into the canister 100 from the tank port 23 forms an adsorption zone from the vicinity of the tank port 23 toward the atmosphere port 25, and the temperature of the activated carbon rises in the adsorption zone owing to the heat of adsorption. The deterioration of the adsorption performance becomes serious when the temperature of the activated carbon is higher than 35° C. (about 35° C.). According to the above configuration, the tank-side adjacent region T is a region where the temperature of the activated carbon can be 35° C. or higher owing to heat generated through adsorption of fuel vapor onto the activated carbon at the time of feeding fuel to the fuel tank, and the adsorbent containing the additive material that is at least one of the phase change material having a phase change temperature of 36° C. or higher and the phase transition material having a phase transition temperature of 36° C. or higher is disposed in the tank-side adjacent region T. This configuration is preferable because it suppresses an increase in the temperature of the activated carbon to higher than 35° C.

Moreover, since the adsorbent containing the activated carbon is disposed in the tank-side adjacent region T, a decrease in an amount of activated carbon to be contained in the adsorbent chamber R is suppressed, whereby the deterioration of the adsorption performance can be suppressed.

(4) In the above embodiment, fibrous meltable cores are given as an example of the meltable cores. However, the meltable cores need only include at least fibrous meltable cores, and may further include powdered meltable core. Examples of the powdered meltable cores include those formed using the same material as the fibrous meltable cores, and the fiber diameter thereof is less than 1 µm. By mixing powdered meltable cores, fibrous meltable cores, activated carbon, a binder, and an additive material together, subjecting the resultant mixture to kneading and the like, and then subjecting the kneaded material to firing and the like, the powdered meltable cores and the fibrous meltable cores sublime. As a result, an adsorbent 10 with pores that are derived from the powdered meltable cores and are less than 1 μm and pores that are derived from the fibrous meltable core and are 1 μm or more is formed. In a molded body of the adsorbent 10, the pores of less than 1 μm and the pores of 1 μm or more may be formed in such a manner that they are present together in a dispersed state with the pores of less than 1 μm being connected to each other via the pores of 1 μm or more. Accordingly, in the adsorbent 10 with such a configuration, fuel vapor flows smoothly through the meltable cores in the adsorbent 10, and the fuel vapor is adsorbed in the meltable cores and the pores of the activated carbon.

Figure 3:
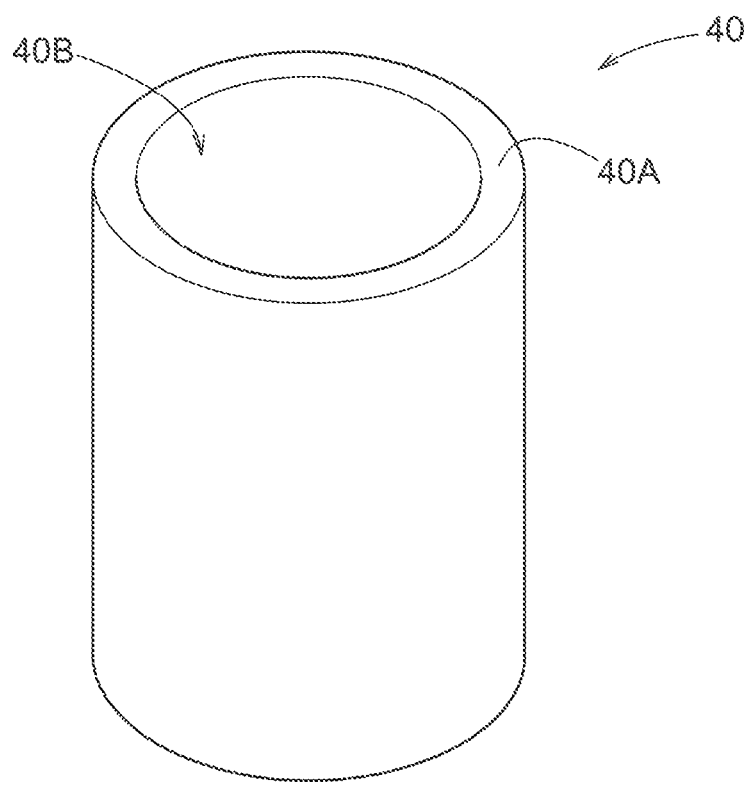
FIG. 3 is a perspective view showing the shape of another adsorbent.

(5) In the above embodiment, the adsorbent 10 has in a honeycomb shape. However, the shape of the adsorbent is not limited to a honeycomb shape as long as the adsorbent has hollow spaces. For example, the adsorbent may have shapes as shown FIGS. 3 and 4. An adsorbent 40 shown in FIG. 3 is a hollow cylindrical molded body that includes a cylindrical wall 40A forming the outer periphery that provides a space 40B, and the space 40B extends in the longitudinal direction. An adsorbent 45 shown in FIG. 4 is a hollow molded body that includes a cylindrical wall 45A forming the outer periphery and radial walls 45B provided inside the cylindrical wall 45A. The radial walls 45B divides a space inside the cylindrical wall 45A in radial directions when viewed from the top, thereby forming spaces 45C that extend in the longitudinal direction. Except for the above, the adsorbents 40 and 45 have the same configuration as the adsorbent 10. The adsorbents 40,45 shown in FIGS. 3 and 4 may also be referred to as hollow pellets.

In the above embodiment, the adsorbent 10 has a honeycomb shape including an array of the square spaces 40B. However, the shape of the space 40B is not limited to a square shape, and may be a polygonal shape such as a triangular shape or a hexagonal shape.

(6) In the above embodiment, an organic binder and an inorganic binder are used as the binder. However, as the binder, at least one of an organic binder and an inorganic binder may be used. In the production of the adsorbent 10, it is preferable to select the type of organic binder to be used depending on the presence or absence of a firing step.

In the case where a firing step is performed, an organic binder commonly used for molding a honeycomb can be used. Accordingly, as described in the above embodiment, the organic binder may be, for example, carboxymethyl cellulose, methyl cellulose, hydroxypropyl methyl cellulose, or hydroxyethyl methyl cellulose. The amount of such an organic binder to be added is about 3 to 10 mass % with respect to the total mass of a raw material used for producing the adsorbent 10, containing activated carbon, meltable cores, an additive material, and a binder.

In the case where a firing step is not performed, the organic binder may be, for example, cellulose such as carboxymethyl cellulose, methyl cellulose, hydroxypropyl methyl cellulose, or hydroxyethyl methyl cellulose or an emulsion binder such as ethylene vinyl acetate (EVA), epoxy, latex, styrene, or butadiene. When the solvent resistance is required, it is preferable to employ a crosslinking agent and a self-crosslinking binder. The amount of such an organic binder to be added is about 3 to 10 mass % with respect to the total mass of the raw material used for producing the adsorbent 10.

(7) In the above-described embodiments, as shown in FIG. 2, the adsorbent chamber R is divided into three regions, namely, the first region 31, the second region 32, and the third region 33. However, a region including the second region 32 and the third region 33 may be divided into three or more regions, instead of being divided into the two regions. Also in such a case, a region that is most closely adjacent to the atmospheric port 25 is the atmosphere-side adjacent region U, and the adsorbent 10 of the above embodiments is disposed in the atmosphere-side adjacent region U.

DESCRIPTION OF REFERENCE SIGNS

10: adsorbent
10A: cylindrical wall
10B: honeycomb wall
10C: space
21: case
22: cover
23: tank port
24: purge port
25: atmospheric port
26: partition wall
27: auxiliary partition wall
R: adsorbent chamber
T: tank-side adjacent region
U: atmosphere-side adjacent region

The invention claimed is:

1. An adsorbent to be packed into a canister, the adsorbent at least comprising:
    activated carbon; and
    an additive material having a higher heat capacity than the activated carbon, the additive material being at least one of a phase change and a phase transition material to suppress temperature change in the activated carbon during purging of an adsorbed fuel,
    wherein the adsorbent has first pores that are derived from the activated carbon and are less than 100 nm and second pores that are derived from meltable cores and are 1 μm or more,
    wherein the adsorbent is in a form of a hollow molded body having an outer diameter of more than 6 mm and not more than 50 mm and in which respective parts have a thickness of not less than 0.2 mm and not more than 1 mm,
    wherein the adsorbent has a volumetric specific heat of 0.08 kcal/L·° C. or more,
    wherein the ratio of the volume of the second pores to the volume of the first pores is not less than 10% and not more than 200%, and
    wherein the additive material is a metal oxide.

2. The adsorbent according to claim 1, wherein the adsorbent has a thermal conductivity of 0.1 kcal/m·h·° C. or more.

3. The adsorbent according to claim 1, wherein a mass of the additive material is not less than 1.0 times and not more than 3.0 times the mass of the activated carbon.

4. The adsorbent according to claim 1,
    wherein the additive material is the phase change material having a phase change temperature of 35° C. or lower, the phase transition material having a phase transition temperature of 35° C. or lower or both the phase change material having a phase change temperature of 35° C. or lower and the phase transition material having a phase transition temperature of 35° C. or lower.

5. The adsorbent according to claim 4,
    wherein a mass of the additive material is not less than 0.05 times and not more than 0.3 times the mass of the activated carbon.

6. The adsorbent according to claim 1, wherein a pore volume of the first pores in the adsorbent is less than 0.55 ml/g, and a ratio of the volume of the second pores to the volume of the first pores is not less than 20% and not more than 90%.

7. The adsorbent according to claim 1, wherein the second pores in a framework of the molded body constituting the adsorbent are present in a proportion of not less than 5 vol % and not more than 40 vol % of the framework.

8. The adsorbent according to claim 1,
wherein the meltable cores are fibrous substances and have a diameter of not less than 1.0 μm and not more than 100 μm and a length of less than 1 mm.

9. The adsorbent according to claim 8,
wherein the meltable cores are pulp fibers that have a length of 0.5 mm or less.

10. The adsorbent according to claim 8,
wherein the adsorbent contains an inorganic binder, and
wherein the meltable cores are present in an amount of not less than 10 mass % and not more than 45 mass % with respect to the total mass of the activated carbon and the inorganic binder.

11. The adsorbent according to claim 8,
wherein the meltable cores have C—N bonds.

12. The adsorbent according to claim 1,
wherein a difference in equilibrium adsorption capacity versus n-butane concentration is more than 35 g/L between an n-butane concentration of 5 vol and an n-butane concentration of 50 vol %.

13. The adsorbent according to claim 1,
wherein a BWC of the adsorbent as determined according to a BWC evaluation method specified in ASTM D5228 is not less than 6.0 g/dL and less than 9.7 g/dL.

14. The adsorbent according to claim 1,
wherein an amount of residual butane as determined after causing the adsorbent to adsorb and then desorb butane according to a BWC evaluation method specified in ASTM D5228 is less than 1.7 g/dL.

15. The adsorbent according to claim 1,
wherein the adsorbent is the molded body that is in at least one form selected from the group consisting of a honeycomb, a hollow pellet, and a honeycomb pellet.

16. The adsorbent according to claim 1,
wherein the second pores of 1 μm or more have an average diameter of not less than 1 μm and not more than 100 μm.

17. The adsorbent according to claim 1,
wherein at least a portion of the parts has a thickness of not less than 0.2 mm and less than 0.6 mm.

18. The adsorbent according to claim 17,
wherein a mass of the additive material is not less than 0.42 times and not more than 3.0 times the mass of the activated carbon.

19. The adsorbent according to claim 18,
wherein a mass of the additive material is not less than 0.42 times and less than 1.5 times the mass of the activated carbon.

20. The adsorbent according to claim 19,
wherein the mass of the additive material is not less than 0.42 times and not more than 1.0 times the mass of the activated carbon.

21. The adsorbent according to claim 17,
wherein a pore volume of the first pores in the adsorbent is less than 0.8 ml/g, and a ratio of the volume of the second pores to the volume of the first pores is not less than 10% and not more than 90%.

22. The adsorbent according to claim 17,
wherein the adsorbent contains an inorganic binder, and
wherein the meltable cores are present in an amount of not less than 5 mass % and not more than 45 mass % with respect to the total mass of the activated carbon and the inorganic binder.

23. The adsorbent according to claim 17,
wherein a BWC of the adsorbent as determined according to a BWC evaluation method specified in ASTM D5228 is not less than 6.0 g/dL and less than 11.0 g/dL.

24. A canister for treating fuel vapor, the canister comprising:
a tank port configured to be in communication with an upper gas chamber of a fuel tank of an internal combustion engine;
a purge port configured to be in communication with an air intake path of the internal combustion engine;
an atmospheric port that is open to the atmosphere; and
an adsorbent chamber through which fuel vapor flows from the tank port to the atmospheric port,
wherein the adsorbent according to claim 1 is disposed in an atmosphere-side adjacent region that is provided adjacent to the atmospheric port in the adsorbent chamber,
wherein the adsorbent includes an additive material that is at least one of a phase change material and a phase transition material, and
wherein the additive material is a metal oxide.

25. The canister according to claim 24,
wherein the adsorbent that contains activated carbon has a BWC as determined according to a BWC evaluation method specified its ASTM D5228 is 15.0 g/dL or more and the phase change material includes a phase change temperature of 36° C. or higher, the phase transition material includes a phase transition temperature of 36° C. or higher, or both the phase change material having a phase change temperature of 36° C. or higher and the phase transition material having a phase transition temperature of 36° C. or higher is disposed in a tank-side adjacent region that is provided adjacent to the tank port the adsorbent chamber.

26. A method for producing the adsorbent according to claim 1, the method comprising:
mixing at least the activated carbon, the additive material that has a higher heat capacity than the activated carbon, and the meltable cores, and the kneading the resultant mixture;
molding the kneaded mixture to obtain the molded body; and
subjecting the molded body to at least one of drying and firing.

27. The method according to claim 26,
wherein the respective parts have a thickness of not less than 0.2 mm and not more than 1 mm, and
wherein a mass of the additive material is not less than 1.0 times and not more than 3.0 times the mass of the activated carbon.

28. The method according to claim 26,
wherein at least a portion of the parts has a thickness of not less than 0.2 mm and less than 0.6 mm, and
wherein a mass of the additive material is not less than 0.42 times and not more than 3.0 times the mass of the activated carbon.

29. The method according to claim 26,
wherein the additive material is a phase change material having a phase change temperature of 35° C. or lower, a phase transition material having a phase transition temperature of 35° C. or lower, or both a phase change material having a phase change temperature of 35' C. or lower and a phase transition material having a phase transition temperature of 35° C. or lower.

30. The method according, to claim 29,
wherein a mass of the additive material is not less than 0.05 times and not more than 0.3 times the mass of the activated carbon.

31. The method according to claim 26,
wherein the kneaded mixture contains an inorganic binder, and
wherein the meltable cores are present in an amount of not less than 10 mass % and not more than 45 mass % with respect to the total mass of the activated carbon and the inorganic binder.

* * * * *